(12) United States Patent
Motomura

(10) Patent No.: US 10,703,165 B2
(45) Date of Patent: Jul. 7, 2020

(54) AIR BLOWING DEVICE

(71) Applicant: DENSO CORPORATION, Kariya, Aichi-pref. (JP)

(72) Inventor: Hirohisa Motomura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 346 days.

(21) Appl. No.: 15/531,635

(22) PCT Filed: Dec. 15, 2015

(86) PCT No.: PCT/JP2015/006253
§ 371 (c)(1),
(2) Date: May 30, 2017

(87) PCT Pub. No.: WO2016/103638
PCT Pub. Date: Jun. 30, 2016

(65) Prior Publication Data
US 2017/0326938 A1    Nov. 16, 2017

(30) Foreign Application Priority Data

Dec. 22, 2014  (JP) .................... 2014-258843
Sep. 24, 2015  (JP) .................... 2015-187044

(51) Int. Cl.
*B60H 1/00* (2006.01)
*B60H 1/34* (2006.01)
(Continued)

(52) U.S. Cl.
CPC ..... *B60H 1/00028* (2013.01); *B60H 1/00692* (2013.01); *B60H 1/242* (2013.01);
(Continued)

(58) Field of Classification Search
CPC ............ B60H 1/00357; B60H 1/00507; B60H 1/00064; B60H 1/00028; B60H 1/00692; B60S 1/023; B60S 1/54
(Continued)

(56) References Cited

U.S. PATENT DOCUMENTS

2006/0030256 A1    2/2006  Kamano et al.
2010/0178861 A1 *  7/2010  Sano .................. B60H 1/00028
                                                                454/127
(Continued)

FOREIGN PATENT DOCUMENTS

JP       S62009129 Y2       3/1987
JP       2004148965 A   *   5/2004
(Continued)

*Primary Examiner* — Vivek K Shirsat
*Assistant Examiner* — Ko-Wei Lin
(74) *Attorney, Agent, or Firm* — Harness, Dickey & Pierce, P.L.C.

(57) ABSTRACT

An air blowing device has a first blowing portion, a duct, and an airflow causing member. The first blowing portion has a guide surface and is provided with a first blowing outlet that blows air from a blower unit into a vehicle compartment. The airflow causing member defines at least one of a first passage and a second passage located on one side and an other side of the airflow causing member in a front-rear direction of a vehicle respectively in the duct. The airflow causing member sets a first condition in which a high-velocity airflow flows in the first passage and a low-velocity airflow flows in the second passage by decreasing a sectional area of the first passage to be smaller than a sectional area of the second passage. The high-velocity airflow flows along the guide surface and is blown into the vehicle compartment.

19 Claims, 20 Drawing Sheets

(51) Int. Cl.
  *B60H 1/24* (2006.01)
  *B60S 1/02* (2006.01)
  *B60S 1/54* (2006.01)
(52) U.S. Cl.
  CPC ............ *B60H 1/3414* (2013.01); *B60S 1/023* (2013.01); *B60S 1/54* (2013.01); *B60H 1/3421* (2013.01); *B60H 2001/00092* (2013.01); *B60H 2001/00192* (2013.01)
(58) Field of Classification Search
  USPC .................................................. 454/121–127
  See application file for complete search history.

(56) References Cited

U.S. PATENT DOCUMENTS

| | | | |
|---|---|---|---|
| 2013/0303071 A1* | 11/2013 | Seki | ...................... B60H 1/3421 |
| | | | 454/155 |
| 2015/0353052 A1* | 12/2015 | Salinas | ................... B60S 1/023 |
| | | | 454/127 |
| 2017/0129312 A1 | 5/2017 | Kato et al. | |

FOREIGN PATENT DOCUMENTS

| | | | | |
|---|---|---|---|---|
| JP | 2005343197 A | | 12/2005 | |
| JP | 2010023640 A | | 2/2010 | |
| JP | 2014180985 A | | 9/2014 | |
| JP | 2014210564 A | * | 11/2014 | ........... B60H 1/3414 |

* cited by examiner

FIG. 23       RELATED ART

AIR BLOWING DEVICE

CROSS REFERENCE TO RELATED APPLICATIONS

This application is a U.S. National Phase Application under 35 U.S.C. 371 of International Application No. PCT/JP2015/006253 filed on Dec. 15, 2015 and published in Japanese as WO 2016/103638 A1 on Jun. 30, 2016. This application is based on and claims the benefit of priority from Japanese Patent Application No. 2014-258843 filed on Dec. 22, 2014 and Japanese Patent Application No. 2015-187044 filed on Sep. 24, 2015. The entire disclosures of all of the above applications are incorporated herein by reference.

TECHNICAL FIELD

The present disclosure relates to an air blowing device that blows air toward a vehicle compartment.

BACKGROUND ART

Patent Literature 1 discloses an air blowing device, for example. The air blowing device described in Patent Literature 1 includes a duct connected to each of blowing outlets and an airflow deflection door disposed in the duct. The airflow deflection door decreases a sectional area of a rear flow path located on a vehicle rear side of the airflow deflection door to be smaller than a sectional area of a front flow path located on a vehicle front side of the airflow deflection door, so as to switch a first condition in which a high-velocity airflow is caused in the rear flow path and in which a low-velocity airflow is caused in the front flow path and a second condition in which an airflow is caused in the duct differently from the first condition. A guide wall is provided at least to a wall of the blowing outlet of the duct on the vehicle rear side, and the high-velocity airflow from the rear flow path is curved toward the vehicle rear side along the guide wall on the first condition.

The blowing outlets of the air blowing device are disposed at two positions in a vehicle compartment and specifically, in front of a driver seat and a passenger seat, respectively.

PRIOR ART LITERATURES

Patent Literature

Patent Literature 1: JP 2014-210564 A

SUMMARY OF INVENTION

FIG. 23 is a schematic diagram illustrating an inside of a vehicle compartment when viewed from a vehicle upper side, in which blowing outlets for blowing air from an air conditioning unit are provided in a general arrangement. An arrow DR1 in FIG. 23 shows a front-rear direction DR1 of the vehicle and an arrow DR2 shows a left-right direction of the vehicle, i.e., a width direction DR2 of the vehicle. In general, the blowing outlets for blowing the air from the air conditioning unit for the vehicle are provided as shown in FIG. 23 in the vehicle compartment. Specifically, in FIG. 23, an instrument panel 70 is disposed in a front area of the vehicle compartment, and two occupants 72a and 72b respectively have two seats 74a and 74b arranged on the vehicle rear side of the instrument panel 70.

At a portion of the instrument panel 70 in front of the driver seat 74a in which the driver 72a sits out of the two seats 74a and 74b (in other words, in front of the driver seat 74a in the vehicle), an HUD (Head up display) 76, a dashboard panel 781 including a speedometer, a tachometer, and the like, and a meter hood 782 for covering the dashboard panel 781 are disposed. A steering wheel 79 is disposed in front of the driver seat 74a so as to protrude from the instrument panel 70 toward the driver seat 74a.

The instrument panel 70 has an upper surface 701. A defroster blowing outlet 901 is open in a center portion of the upper surface 701 on the vehicle front side and blows air from the air conditioning unit toward a windshield (not shown). The instrument panel 70 has a side surface 702 that is a center portion of the instrument panel 70 facing the vehicle rear side and has end portions in the width direction. A side face outlet 902a and a side face outlet 902b are open in the end portions of the side surface 702 respectively. A center face blowing outlet 903 is open in a center portion of the side surface 702 of the instrument panel 70. All of the blowing outlets 901, 902a, 902b, and 903 are blowing outlets that blow the air from the air conditioning unit.

In contrast to the above-described arrangement of the outlets, the blowing outlets 901, 902a, 902b, and 903 shown in FIG. 23 are integrated into blowing outlets 92 in the air blowing device in Patent Literature 1. Specifically, the air blowing device in Patent Literature 1 is disposed in front of each of two seats 74a and 74b. In other words, each of the blowing outlets 92 of the air blowing devices is provided in a portion of the upper surface 701 of the instrument panel 70 in front of each of the two seats 74a and 74b as shown in FIG. 24. FIG. 24 is a schematic diagram illustrating an inside of a vehicle compartment when viewed from the vehicle upper side, in which the blowing outlets 92 of the air blowing devices in Patent Literature 1 are provided. FIG. 24 corresponds to FIG. 23.

However, according to studies by an inventor of the present disclosure, when the blowing outlet 92 of the air blowing device in Patent Literature 1 is disposed in front of the driver seat 74a as shown in FIG. 24, a place where the blowing outlet 92 is to be disposed overlaps the HUD 76, the dashboard panel 781, or the meter hood 782 in many cases in an actual mounted state in the vehicle. Therefore, it is difficult to dispose the blowing outlet 92 in front of the driver seat 74a as described in Patent Literature 1. Moreover, at a portion of the instrument panel 70 in front of the passenger seat 74b, a storage box (not shown) for storing small goods as well as a glove box is provided in some cases. In this case, it is difficult to dispose the blowing outlet 92 in front of the passenger seat 74b, because a place where the blowing outlet 92 is to be disposed overlaps the storage box.

The present disclosure addresses the above issues. Thus, it is a first objective of the present disclosure to provide an air blowing device that can improve mountability thereof as compared to the air blowing device of Patent Literature 1. In addition, it is a second objective of the present disclosure to provide an air blowing device that can secure an air conditioning performance at the same level as the air blowing device of Patent Literature 1.

An air blowing device of the present disclosure has a first blowing portion, a duct, and an airflow causing member.

The first blowing portion is provided with a first blowing outlet that blows air from a blower unit into a vehicle compartment. The duct is connected to the first blowing portion and provided with a duct air passage that guides the air from the blower unit to the first blowing outlet. The airflow causing member is disposed in the duct air passage.

The first blowing portion has a guide surface on one side in a front-rear direction of a vehicle. The guide surface configures a part of the first blowing portion. The guide surface has a cross-sectional shape that enlarges the first blowing portion toward the one side and toward a downstream side in a flow direction of the air when viewed in a width direction of the vehicle.

The airflow causing member defines one of a first passage and a second passage or both the first passage and the second passage as a part of the third air passage. The first passage is located on the one side of the airflow causing member in the front-rear direction. The second passage is located on the other side of the airflow causing member in the front-rear direction. The airflow causing member is configured to be capable of setting a first condition in which a flow of air flowing in the third duct air passage is divided into a high-velocity airflow flowing in the first passage and a low-velocity airflow flowing in the second passage by decreasing a sectional area of the first passage to be smaller than a sectional area of the second passage. The high-velocity airflow flows along the first guide surface and being blown into the vehicle compartment, and the low-velocity airflow flows at a flow velocity lower than that of the high-velocity airflow.

The first blowing outlet is located on the other side of a first seat and a second seat, that are disposed in the vehicle compartment and arranged in the width direction, and is located in a center area of the vehicle compartment in the width direction.

According to the present disclosure, the first blowing outlet is located in the center area of the vehicle compartment in the width direction. Accordingly, the first blowing outlet is prevented from overlapping with a meter hood etc., and thereby mountability of the air blowing device can be improved as compared to the air blowing device of Patent Literature 1.

The air blowing device of the present disclosure may further have a second blowing portion and a third blowing portion. The second blowing portion is provided with a second blowing outlet that blows air from the blower unit into the vehicle compartment. The third blowing portion is provided with a third blowing outlet that blows air from the blower unit into the vehicle compartment. The second blowing outlet is located on a side opposite to the second seat with respect to a center position of the first seat in the width direction. The third blowing outlet is located on a side opposite to the first seat with respect to a center position of the second seat in the width direction.

Accordingly, the air from the blower unit can be blown widely into the vehicle compartment in the width direction by the first blowing outlet, the second blowing outlet, and the third blowing outlet. Thus, an air conditioning performance can be secured at the same level as the air blowing device of Patent Literature 1.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
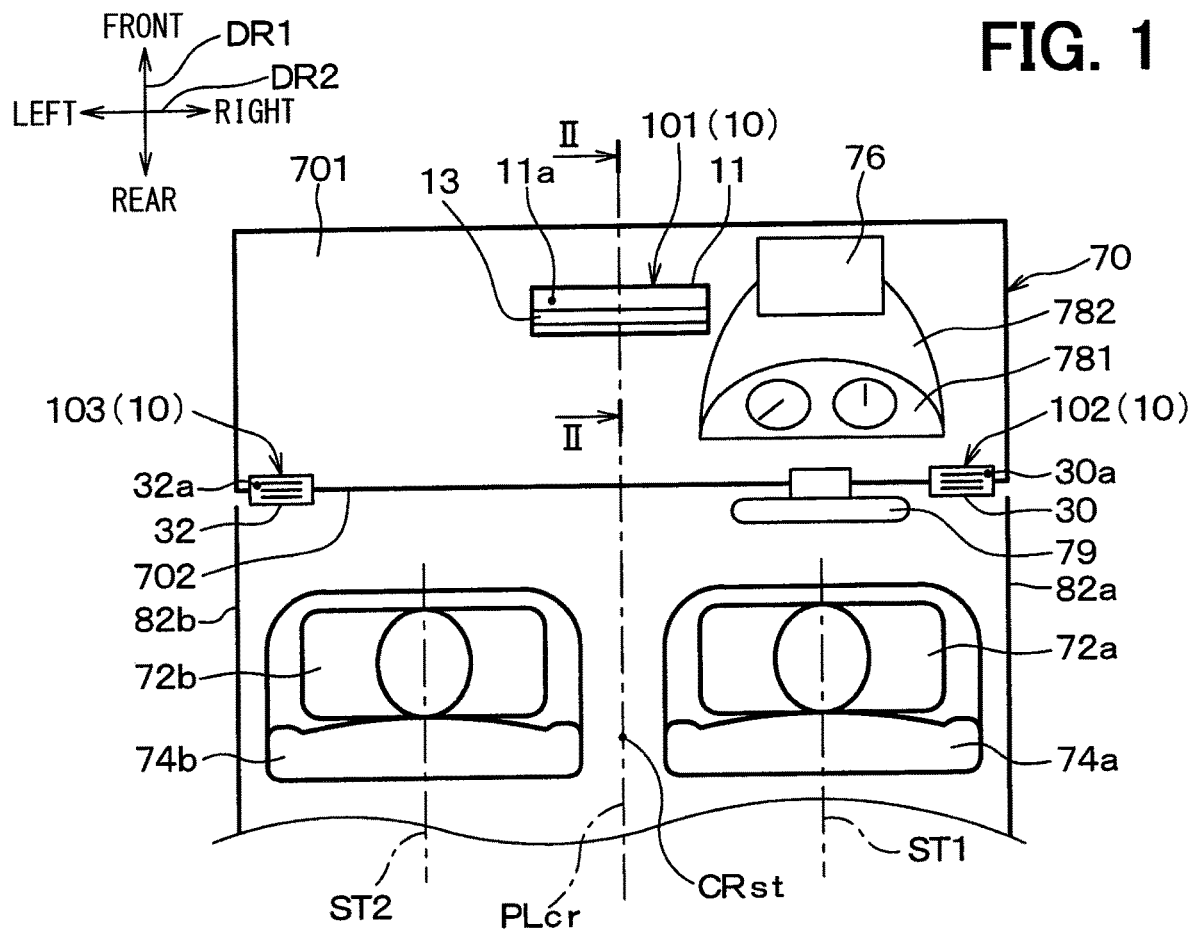
FIG. 1 is a schematic diagram illustrating a front area of a vehicle compartment when viewed from a vehicle upper side according to a first embodiment.

FIG. 1 is a schematic diagram illustrating a front area of a vehicle in a vehicle compartment when viewed from above. In the present embodiment, an air blowing device 10 according to the present disclosure is applied to blowing outlets and ducts of an air conditioning unit 20 (see FIG. 2) mounted to a front area of the vehicle. An arrow DR1 in FIG. 1 shows a front-rear direction DR1 of the vehicle, an arrow DR2 in FIG. 1 shows a left-right direction of the vehicle, i.e., a width direction DR2 of the vehicle, and an arrow DR3 in FIG. 2 (described later) shows an up-down direction (vertical direction) DR3 of the vehicle. The three directions DR1, DR2, DR3 are directions orthogonal to each other.

The air conditioning unit 20 in the present embodiment is a known device disposed in an instrument panel 70 and configured to blow conditioned air at an adjusted temperature into the vehicle compartment. For example, the air conditioning unit 20 is the same as the air conditioning unit shown in FIG. 2 of Patent Literature 1. For the air blowing device 10, the air conditioning unit 20 functions as a blower device for blowing the air to the air blowing device 10.

As shown in FIG. 1, the air blowing device 10 includes a center blowing unit 101 as a first blowing unit, a right blowing unit 102 as a second blowing unit, and a left blowing unit 103 as a third blowing unit.

As in the general vehicle, the instrument panel 70 is disposed in a front area of the vehicle in the vehicle compartment and a driver seat 74a as a first seat and a passenger seat 74b as a second seat are housed in the vehicle compartment. The two seats 74a and 74b are front seats in the vehicle compartment and arranged in the width direction DR2 on a vehicle rear side of the instrument panel 70. The driver seat 74a is located on a right side, and the passenger seat 74b is located on a left side, facing a vehicle front side. Occupants 72a and 72b respectively have the two seats 74a and 74b.

An HUD (Head up display) 76, a dashboard panel 781, and a meter hood 782 are provided in the instrument panel 70 in front of the driver seat 74a. The dashboard panel 781 is a meter panel including a speedometer, a tachometer, or the like. The meter hood 782 covers the dashboard panel 781. "In front of the driver seat 74a" is, in other words, the vehicle front side of the driver seat 74a. A steering wheel 79 is disposed in front of the driver seat 74a so as to protrude from the instrument panel 70 toward the driver seat 74a.

Figure 2:
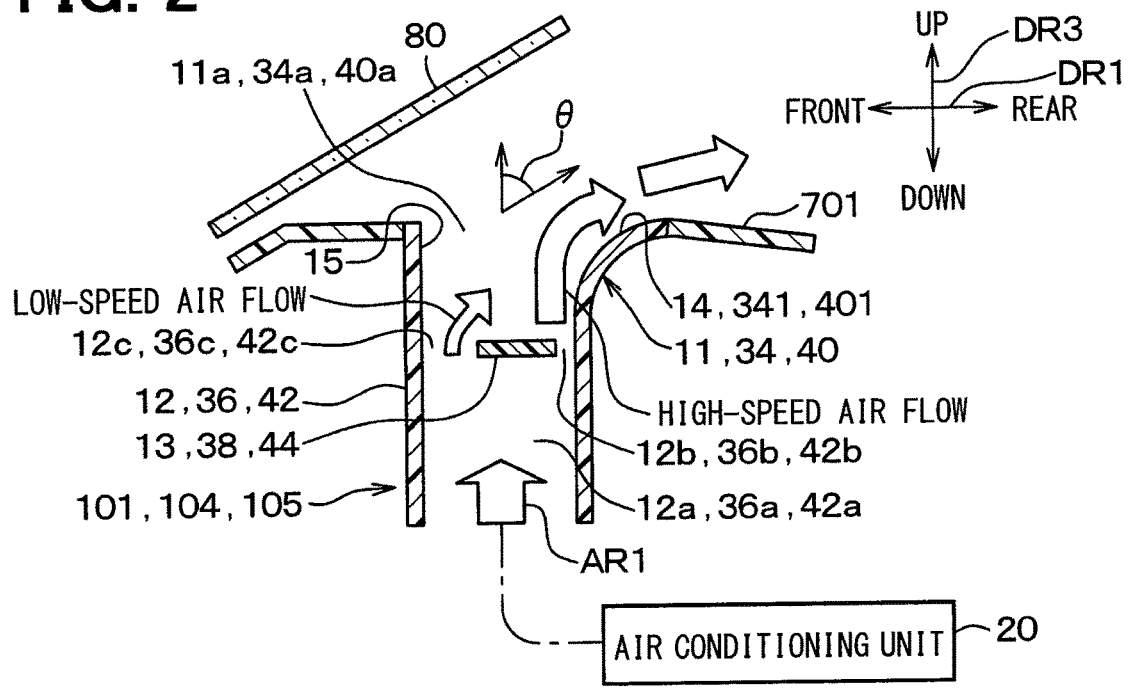
FIG. 2 is a cross-sectional view taken along a line II-II in FIG. 1 and illustrating a center blowing unit in a face mode.

The center blowing unit 101 in FIG. 1 has the same structure as the air blowing device in Patent Literature 1. FIG. 2 is a cross-sectional view taken along a line II-II shown in FIG. 1. As shown in FIG. 2, the center blowing unit 101 has a first blowing portion 11, a duct 12, and an airflow deflection door 13. The first blowing portion 11 is provided with a first blowing outlet 11a that blows air, which flows from of the air conditioning unit 20, into the vehicle compartment as an air conditioning target space. The duct 12 is connected to the first blowing portion 11. The airflow deflection door 13 is disposed as an airflow causing member.

The first blowing outlet 11a blows air having the temperature adjusted by the airflow deflection door 13 in two blowing modes, i.e., a defroster mode and a face mode. The blowing modes of the center blowing unit 101 are the same as blowing modes of the air blowing device 10. Here, the defroster mode is a blowing mode in which air is blown toward a windshield glass 80 (i.e., a window) to defog the window. The face mode is a blowing mode in which air is blown toward upper bodies of the occupants 72a and 72b (see FIG. 1).

The first blowing outlet 11a is in a narrow and long shape extending in the width direction DR2 as shown in FIG. 1. The first blowing outlet 11a is provided in a front portion of an upper surface 701 of the instrument panel 70, provided in the vehicle compartment. In short, the first blowing outlet 11a is located on the vehicle front side of the driver seat 74a and the passenger seat 74b in the front-rear direction DR1. The first blowing portion 11 provided with the first blowing outlet 11a configures a part of the instrument panel 70, i.e., a peripheral portion of the first blowing outlet 11a.

The first blowing outlet 11a is disposed at a central portion in the vehicle compartment in the width direction DR2. Specifically, the first blowing outlet 11a is disposed so as to be divided in the width direction DR2 by an imaginary plane PLcr that passes through a center position CRst between the driver seat 74a and the passenger seat 74b in the width direction DR2 and that divides the vehicle compartment in the width direction DR2. The first blowing outlet 11a is formed so that the entire first blowing outlet 11a is positioned between a center position ST1 of the driver seat 74a and a center position ST2 of the passenger seat 74b in the width direction DR2. In this arrangement, the first blowing outlet 11a does not overlap with any of the HUD 76, the dashboard panel 781, and the meter hood 782.

As shown in FIG. 2, the duct 12 is a pipe-shaped member that is interposed between the first blowing outlet 11a and the air conditioning unit 20 to connect the first blowing outlet 11a and the air conditioning unit 20. A duct air passage 12a guiding the air flowing out of the air conditioning unit 20 to the first blowing outlet 11a is defined inside the duct 12. The duct 12 is formed as a body separate from the air conditioning unit 20 and made of resin, for example, and connected to the air conditioning unit 20. The temperature-adjusted air adjusted by the air conditioning unit 20 flows into the duct 12 from the air conditioning unit 20 as shown by an arrow AR1. The duct air passage 12a has a passage section in a rectangular shape conforming to a shape of the first blowing outlet 11a shown in FIG. 1.

As shown in FIG. 2, the airflow deflection door 13 is disposed in the duct air passage 12a and operation of the airflow deflection door 13 is controlled by control signals output from a controller (not shown). The airflow deflection door 13 is provided in the duct air passage 12a to define two parallel passages. The two parallel passages are a rear passage (i.e., a first passage) 12b and a front passage (i.e., a second passage) 12c that configure a part of the duct air passage 12a. For example, a downstream end portion of the duct air passage 12a on a downstream side in a flow direction of air flowing in the duct air passage 12a is a passage extending in the up-down direction DR3 of the vehicle, and the airflow deflection door 13 is provided in the downstream end portion of the duct air passage 12a.

Specifically, the airflow deflection door 13 defines the rear passage 12b therein as a part of the duct air passage 12a. The rear passage 12b is located on the vehicle rear side of the airflow deflection door 13. The vehicle rear side is one side in the front-rear direction DR1. In addition, the airflow deflection door 13 defines the front passage 12c therein as a part of the duct air passage 12a. The front passage 12c is located on the vehicle front side of the airflow deflection door 13. The vehicle front side is the other side in the front-rear direction DR1. Although a direction of the air flow (i.e., the direction of the arrow AR1) in the downstream end portion of the duct air passage 12a is upward in FIG. 2, the direction of the air flow may be inclined with respect to the up-down direction DR3, when the direction includes an upward component.

The airflow deflection door 13 is a sliding door that is slidable in the front-rear direction DR1, for example. As shown in FIG. 2, a length of the airflow deflection door 13 is shorter than a width of the duct air passage 12a in the front-rear direction DR1 so as to be able to form the front passage 12c and the rear passage 12b. As shown in FIG. 1, the airflow deflection door 13 has a length in the width direction DR2, e.g., that covers an entire length of the duct air passage 12a in the width direction DR2.

As shown in FIG. 2, the airflow deflection door 13 functions as an airflow causing member that causes an airflow flowing in the front passage 12c and an airflow flowing in the rear passage 12b. Specifically, the airflow deflection door 13 changes a position thereof in the front-rear direction DR1 so as to change a flow velocity of an airflow flowing in the duct air passage 12a. In other words, the airflow deflection door 13 moves in the front-rear direction DR1 in the duct air passage 12a to thereby change a ratio between a sectional area of the front passage 12c and a sectional area of the rear passage 12b. By changing the ratio between the sectional area of the front passage 12c and the sectional area of the rear passage 12b, the airflow deflection door 13 differentiates the airflow velocity in the front passage 12c and the airflow velocity of the rear passage 12b from each other.

Specifically, the airflow deflection door 13 switches between a first condition and a second condition and changes a flow state of air flowing in the duct air passage 12a, by sliding in the front-rear direction DR1. The first condition is a condition in which a high-velocity airflow (i.e., a jet flow) is caused in the rear passage 12b and in which a low-velocity airflow is caused in the front passage 12c by decreasing the sectional area of the rear passage 12b, by using the airflow deflection door 13, to be smaller than the sectional area of the front passage 12c. The high-velocity airflow flows along a guide surface 14 (described later) into the vehicle compartment. The low-velocity airflow flows at a flow velocity lower than that of the high-velocity airflow. The second condition is a condition in which an airflow is caused in the duct air passage 12a differently from the first condition.

The airflow deflection door 13 is formed to be able to adjust a ratio between velocities of the high-velocity airflow and the low-velocity airflow by sliding to change the ratio between the sectional area of the rear passage 12b and the sectional area of the front passage 12c in the first condition. The airflow deflection door 13 only needs to be able to differentiate the airflow velocities in the rear passage 12b and the front passage 12c from each other and does not need to completely separate the rear passage 12b and the front passage 12c from each other.

The first blowing portion 11 includes the guide surface 14 forming a part of the first blowing outlet 11a on the one side in the front-rear direction DR1, i.e., the vehicle rear side. The guide surface 14 is a curved surface having a protruding shape in a cross section viewed in the width direction DR2 (refer to FIG. 1), i.e., in a cross section shown in FIG. 2. T The guide surface 14 enlarges the first blowing outlet 11a toward a downstream side in the flow direction of air and toward the vehicle rear side in the cross section viewed in the width direction DR2. The guide surface 14 is connected to the upper surface 701 of the instrument panel 70 on a side opposite to a side on which the guide surface 14 is connected to the duct 12. The guide surface 14 guides the high-velocity airflow flowing out of the rear passage 12b toward the vehicle rear side along the guide surface 14.

The right blowing unit 102 shown in FIG. 1 has a second blowing portion 30 provided with a second blowing outlet 30a and an air guide duct (not shown) guiding the air flowing out of the air conditioning unit 20 to the second blowing outlet 30a. The second blowing outlet 30a is an air blowing outlet connected to the air conditioning unit 20 and blows the air flowing out of the air conditioning unit 20 into the vehicle compartment.

Figure 23:
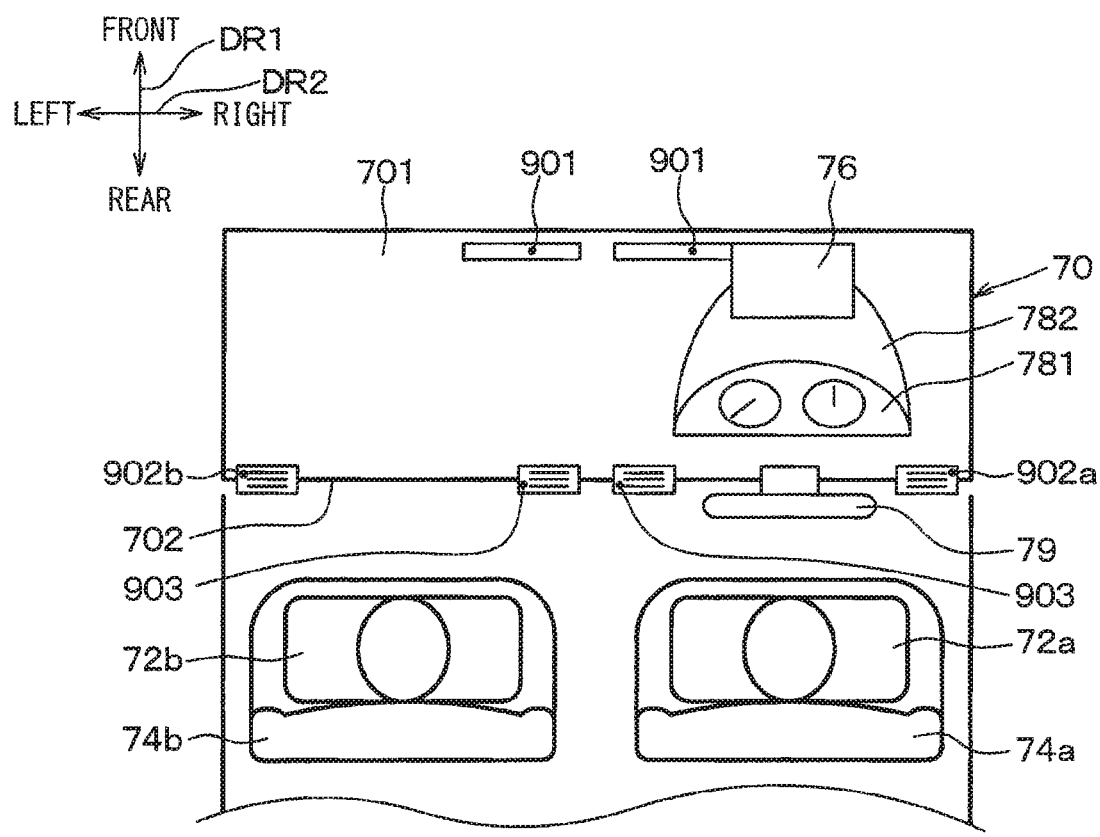
FIG. 23 is a first diagram for explaining a problem to be solved by the present disclosure and is a schematic diagram illustrating an inside of a vehicle compartment viewed from a vehicle upper side, in which blowing outlets for blowing air from an air conditioning unit are provided in a general arrangement.
Figure 24:
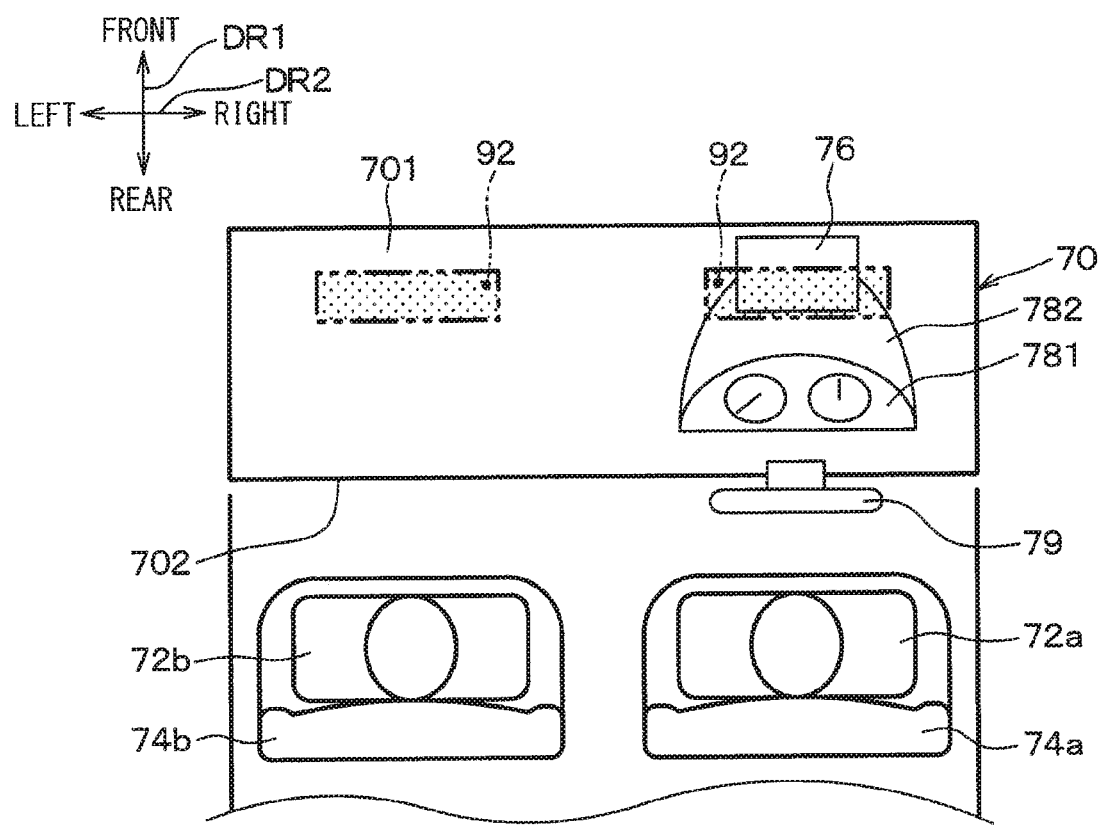
FIG. 24 is a second diagram for explaining the problem to be solved by the present disclosure and is a schematic diagram illustrating an inside of a vehicle compartment viewed from a vehicle upper side, in which blowing outlets of air blowing devices in Patent Literature 1 are provided.

The second blowing outlet 30a is provided in a front portion 702 of the instrument panel 70 facing the vehicle rear side on a side adjacent to the seats 74a and 74b. In short, the second blowing outlet 30a is arranged on the vehicle front side of the driver seat 74a and the passenger seat 74b in the front-rear direction DR1. The second blowing portion 30 provided with the second blowing outlet 30a configures a portion of the front portion 702 around the second blowing outlet 30a. The second blowing outlet 30a is located on a side opposite to the passenger seat 74b with respect to a center position ST1 of the driver seat 74a in the width direction DR2. The second blowing outlet 30a of the present embodiment is configured as a side face outlet that is located on a side adjacent to the driver seat 74a and that can blow the air toward the driver seat 74a. The second blowing outlet 30a is the same as the side face outlet 902a in FIG. 23, for example.

The second blowing outlet 30a is provided with a manual louver that changes a blowing direction of the second blowing outlet 30a. Therefore, the occupant can operate the louver to change the direction of the air blowing from the second blowing outlet 30a into a desired direction.

The left blowing unit 103 and the right blowing unit 102 are formed symmetrically in the width direction DR2. In other words, the left blowing unit 103 has a third blowing portion 32 and a guide duct (not shown). The third blowing portion 32 is provided with a third blowing outlet 32a, and the air guide duct (not shown) guides the air flowing out of the air conditioning unit 20 to the third blowing outlet 32a. The third blowing outlet 32a is an air blowing outlet connected to the air conditioning unit 20 and blows the air flowing out of the air conditioning unit 20 into the vehicle compartment. The first blowing outlet 11a, the second blowing outlet 30a, and the third blowing outlet 32a are connected in parallel with each other to the air conditioning unit 20.

The third blowing outlet 32a is provided in the front portion 702 of the instrument panel 70. That is, the third blowing outlet 32a is arranged on the vehicle front side of the driver seat 74a and the passenger seat 74b in the front-rear direction DR1. The third blowing portion 32 provided with the third blowing outlet 32a configures a portion of the front portion 702 around the third blowing outlet 32a. The third blowing outlet 32a is located on a side opposite to the driver seat 74a with respect to a center position ST2 of the passenger seat 74b in the width direction DR2. The third blowing outlet 32a of the present embodiment is configured as a side face outlet that is located on a side adjacent to the passenger seat 74b and that can blow the air toward the passenger seat 74b. The third blowing outlet 32a is the same as the side face outlet 902b in FIG. 23, for example.

The third blowing outlet 32a is provided with a manual louver that changes a blowing direction of the third blowing outlet 32a similarly to the second blowing outlet 30a. Therefore, the occupant can operate the louver to change the direction of the air blowing from the third blowing outlet 32a into a desired direction.

For example, a blowing mode of the air conditioning unit 20 (see FIG. 2) is selectively switched among a foot mode in which air is blown toward feet of the occupants, the face mode as a normal blowing mode in which air is blown toward upper bodies of the occupants 72a and 72b, and the defroster mode in which air is blown toward the windshield, i.e., the windshield glass 80 (see FIG. 2) to defog the windshield glass 80. The blowing mode of the air conditioning unit 20 is also the blowing mode of the air blowing device 10.

In the foot mode, in the air conditioning unit 20, air passages communicating with the respective blowing outlets 11a, 30a, and 32a of the air blowing device 10 are closed by an opening/closing door of the air conditioning unit 20. Therefore, almost no air is blown from the air blowing device 10. On the other hand, the air conditioning unit 20 blows air from foot blowing outlets provided in the air conditioning unit 20.

In the face mode and the defroster mode, the air flowing out of the air conditioning unit 20 (see FIG. 2) is blown out of the respective blowing outlets 11a, 30a, and 32a of the air blowing device 10. In this case, each of the airflow deflection doors 13 (see FIG. 2) is positioned at a position corresponding to each of the blowing modes.

In the present embodiment, the airflow deflection door 13 shown in FIG. 2 is moved in the front-rear direction DR1 to change the position of the airflow deflection door 13 as follows in the face mode and the defroster mode. In this way, the airflow velocity in the rear passage 12b and the airflow velocity in the front passage 12c are changed to thereby change a blowing angle θ. Here, the blowing angle θ is an angle formed by a blowing direction with the up-down direction (i.e., a vertical direction) DR3 as shown in FIG. 2. Since the blowing direction of the first blowing outlet 11a when the duct 12 is not provided with the airflow deflection door 13 is a vertically upward direction, the vertical direction is used as a reference direction.

First, the face mode will be described. As shown in FIG. 2, when the blowing mode is the face mode, the airflow deflection door 13 is positioned on the vehicle rear side such that air flows both in the rear passage 12b and the front passage 12c on a condition that a ratio of the sectional area of the rear passage 12b becomes smaller than a ratio of the sectional area of the front passage 12c. Accordingly, air flows in the duct air passage 12a on the first condition in which the high-velocity airflow is caused in the rear passage 12b and the low-velocity airflow is caused in the front passage 12c. The high-velocity airflow flows along the guide surface 14 and is thereby curved toward the vehicle rear side by the Coanda effect.

Figure 3:
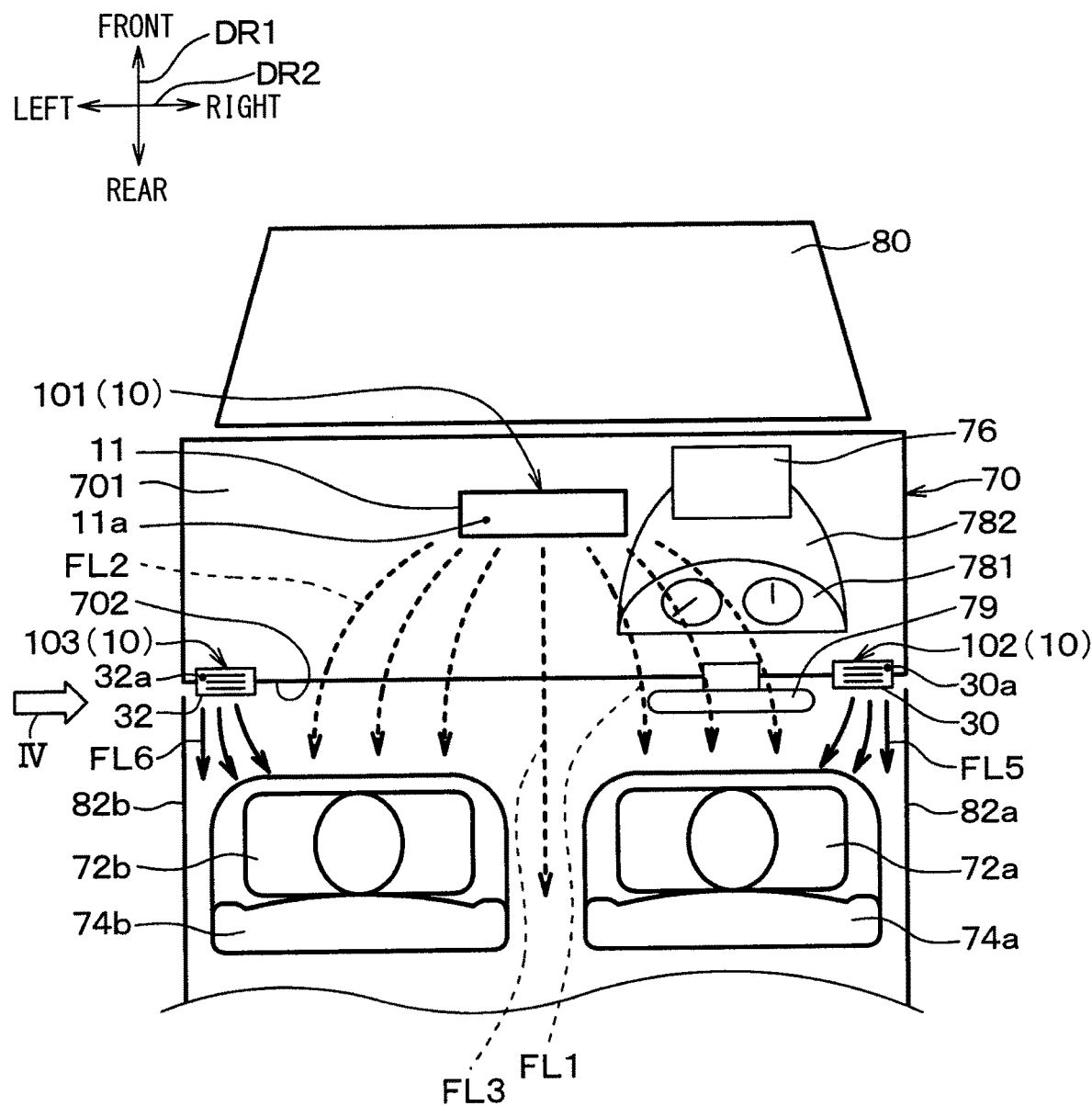
FIG. 3 is a schematic diagram illustrating a front area of the vehicle compartment when viewed from the vehicle upper side and illustrating a flow or air flowing out of an air blowing device in the face mode, relative to FIG. 1 according to the first embodiment.

As a result, as shown in FIG. 3 and FIG. 3, air (i.e., a cool air) of which temperature is adjusted in the air conditioning unit 20 is blown from the first blowing outlet 11a toward upper bodies of the occupants 72a, 72b as shown by dashed-lines FL1, FL2 respectively. The air flows between the driver seat 74a and the passenger seat 74b and reaches a rear seat arranged on the vehicle rear side of the driver seat 74a and the passenger seat 74b as shown by a dashed-line FL3. At the same time, the air flowing out of the air conditioning unit 20 is also blown out of the second blowing outlet 30a and the third blowing outlet 32a as respectively shown by solid-line arrows FL5 and FL6.

Figure 4:
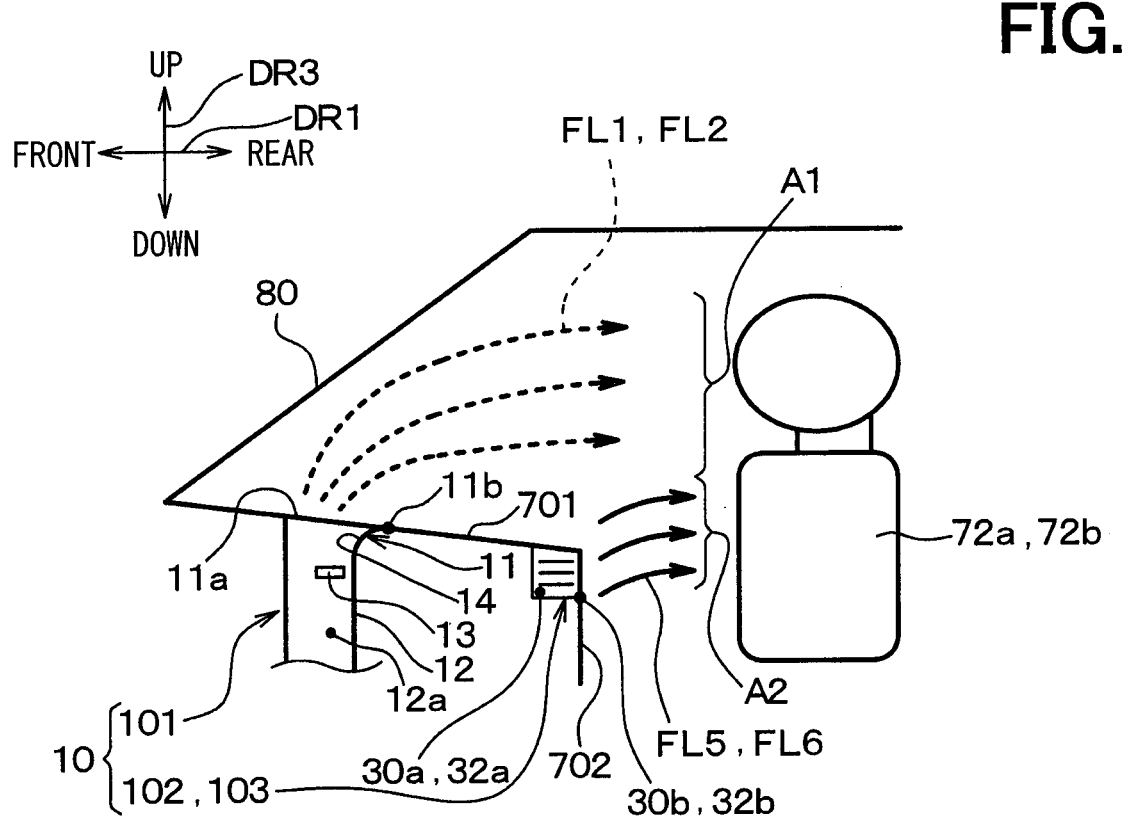
FIG. 4 is a schematic diagram illustrating the front area of the vehicle compartment when viewed from a vehicle left side in a direction IV shown in FIG. 3 and illustrating a flow of air flowing out of the air blowing device in the face mode.

Here, FIG. 3 is a schematic diagram illustrating the front area of the vehicle in the vehicle compartment when viewed from above and is a diagram illustrating the flows of air blowing from the air blowing device 10 in the face mode. FIG. 4 is a schematic diagram illustrating the front area of the vehicle in the vehicle compartment when viewed from a left side as shown by an arrow IV in FIG. 3 and is a diagram illustrating the flows of air blowing from the air blowing device 10 in the face mode. The blowing units 102 and 103, the blowing outlets 30a and 32a, the occupants 72a and 72b are disposed symmetrically in the width direction DR2. Therefore, a reference sign designating each of elements on a vehicle right side and a reference sign designating each of elements on a vehicle left side are shown side by side in FIG. 4 and the same holds true for FIG. 7 described below.

The ratio of the sectional area of the rear passage 12b is a ratio RT1 of the sectional area AP1 of the rear passage 12b to the total sectional area APa that is the sum of the sectional areas of the rear passage 12b and the front passage 12c (RT1=AP1/APa). The ratio of the sectional area of the front passage 12c is a ratio RT2 of the sectional area AP2 of the front passage 12c to the total sectional area APa described above (RT2=AP2/APa).

When the blowing mode is the face mode, the occupant 72a or 72b can manually adjust the position of the airflow deflection door 13 or a controller can automatically adjust the position of the airflow deflection door 13. With this, a ratio between the velocities of the high-velocity airflow and the low-velocity airflow shown in FIG. 2 is adjusted to obtain the arbitrary blowing angle θ in the face mode.

As shown in FIG. 4, the upper surface 701 of the instrument panel 70 inclines downward toward the vehicle rear side. The first blowing outlet 11a has a lowermost portion (i.e., a first lowermost portion) 11b that is located on a downstream end of the first blowing outlet 11a in a flow direction of air flowing out of the first blowing outlet 11a and on a lowermost end of the first blowing outlet 11a. The second blowing outlet 30a has a lowermost portion (i.e., a second lowermost portion) 30b that is located on a downstream end of the second blowing outlet 30a in a flow direction of air flowing out of the second blowing outlet 30a and on a lowermost end of the second blowing outlet 30a. The third blowing outlet 32a has a lowermost portion (i.e., a third lowermost portion) 32b that is located on a downstream end of the third blowing outlet 32a in a flow direction of air flowing out of the third blowing outlet 32a and on a lowermost end of the third blowing outlet 32a. The first blowing outlet 11a is provided such that the lowermost portion 11b of the first blowing outlet 11a is located above the lowermost portion 30b of the second blowing outlet 30a and the lowermost portion 32b of the third blowing outlet 32a.

More specifically, the lowermost portion 11b of the first blowing outlet 11a is a portion that is located at the downstream end of the first blowing outlet 11a and at a rearmost end of the first blowing outlet 11a. That is, the first blowing outlet 11a is arranged such that the rearmost and downstream end of the first blowing outlet 11a is located above the lowermost portion 30b of the second blowing outlet 30a and the lowermost portion 32b of the third blowing outlet 32a.

Figure 5:
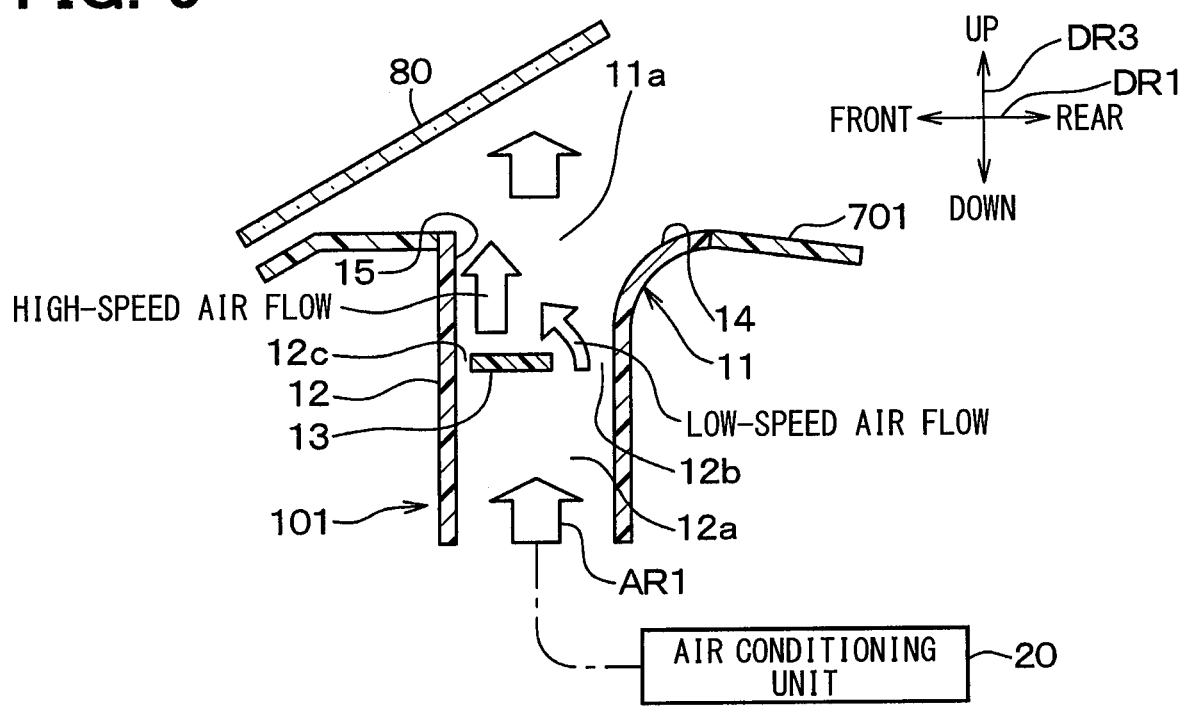
FIG. 5 is a cross-sectional view taken along a line II-II in FIG. 1 and is a view illustrating the center blowing unit in a defroster mode.

Next, the defroster mode will be described. FIG. 5 is a cross-sectional view taken along a line II-II in FIG. 1 and is a view illustrating the center blowing unit 101 in the defroster mode. As shown in FIG. 5, when the blowing mode is the defroster mode, the airflow deflection door 13 is positioned on the vehicle front side such that the ratio of the sectional area of the front passage 12c decreases and that the ratio of the sectional area of the rear passage 12b increases. As a result, air flowing in the duct air passage 12a flows on a second condition, which is different from the first condition, in which a flow velocity of an airflow (i.e., a low-velocity airflow shown in FIG. 5) flowing in the rear passage 12b is lower than a flow velocity of an airflow (i.e., a high-velocity airflow shown in FIG. 5) flowing in the front passage 12c, by increasing the sectional area of the rear passage 12 to be larger than the sectional area of the front passage 12c. The low-velocity airflow in the rear passage 12b flows along a front inner wall surface 15, almost without flowing along the guide surface 14, upward together with the high-velocity airflow in the front passage 12c. The front inner wall surface 15 is included in the first blowing portion 11 and configures a front portion of the first blowing outlet 11a. That is, the front inner wall surface faces the guide surface 14 in the front-rear direction DR1.

Figure 6:
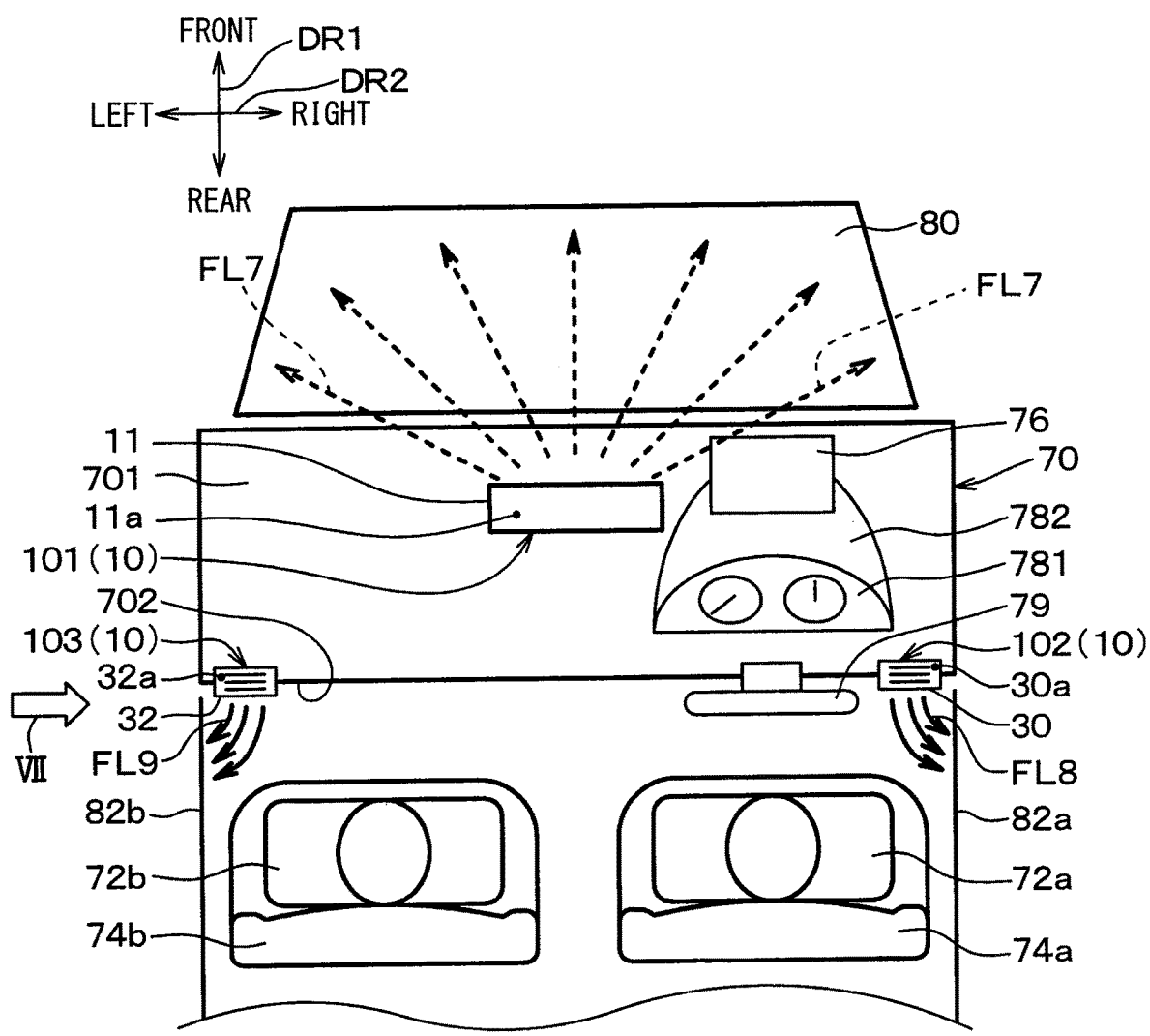
FIG. 6 is a schematic diagram corresponding to FIG. 3 and is a diagram illustrating flows of air blowing from the air blowing device in the defroster mode.
Figure 7:
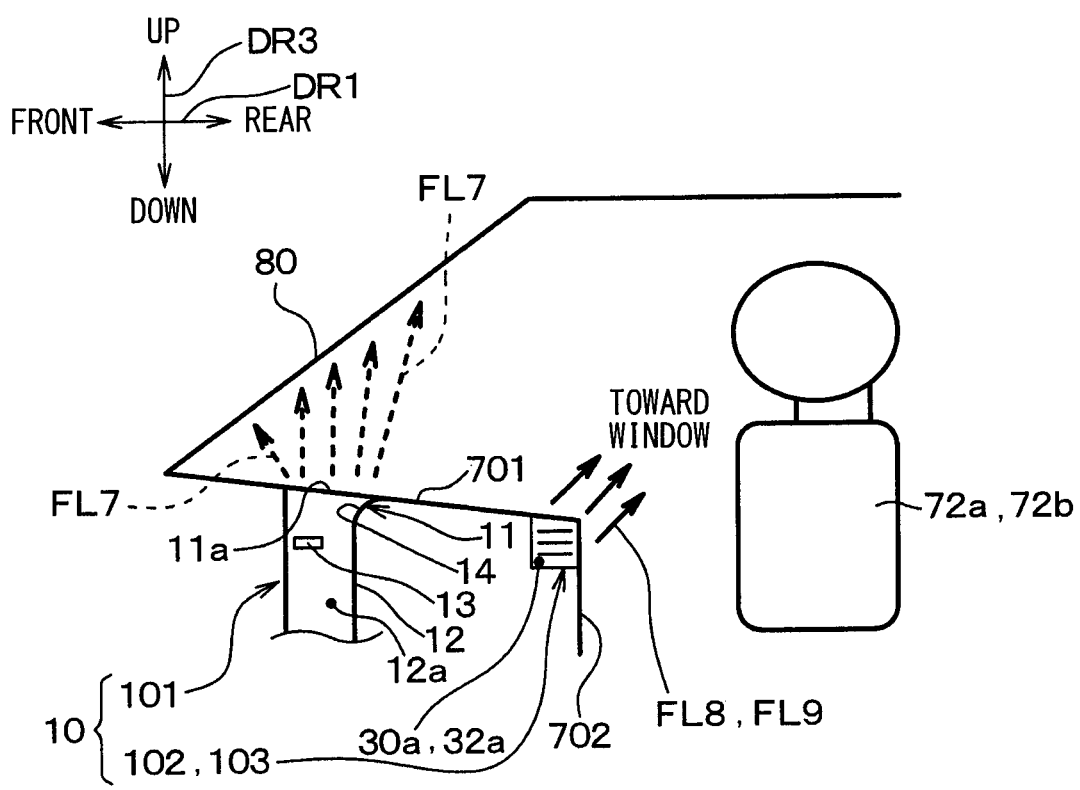
FIG. 7 is a schematic diagram illustrating the front area of the vehicle compartment when viewed from the vehicle left side in a direction VII shown in FIG. 6 and illustrating a flow of air flowing out of the air blowing device in the defroster mode.

As a result, as shown in FIGS. 6 and 7, the temperature-adjusted air (e.g., warm air) adjusted by the air conditioning unit 20 is blown out of the first blowing outlet 11a toward the windshield glass 80 as shown by broken-line arrows FL7. At the same time, the air flowing out of the air conditioning unit 20 is blown out of the second blowing outlet 30a and the third blowing outlet 32a as respectively shown by solid-line arrows FL8 and FL9.

FIG. 6 is a schematic diagram corresponding to FIG. 3 and is a diagram illustrating flows of air blowing from the air blowing device 10 in the defroster mode. FIG. 7 is a schematic diagram illustrating the front area of the vehicle in the vehicle compartment when viewed from the left side as shown by an arrow VII in FIG. 6 and is a diagram illustrating the flows of air blowing from the air blowing device 10 in the defroster mode.

When the blowing mode is the defroster mode, the occupant can manually adjust the position of the airflow deflection door 13 or the controller can automatically adjust the position. With this, the ratio between the velocities of the high-velocity airflow and the low-velocity airflow shown in FIG. 5 is adjusted to obtain an arbitrary blowing angle θ in the defroster face mode.

Next, effects of the present embodiment will be described. As described above, according to the present embodiment, the first blowing outlet 11a is disposed in the central portion in the vehicle compartment in the width direction DR2. In this way, it is possible to prevent overlap of the first blowing outlet 11a with the meter hood 782 or the like disposed in front of the driver seat 74a. Therefore, in mounting the air blowing device 10 of the present embodiment to the vehicle, it is possible to improve ease of mounting to the vehicle as compared with that of the air blowing device in Patent Literature 1.

The first blowing outlet 11a is located in a center area of the vehicle compartment in the width direction DR2. The second blowing outlet 30a is located on a side opposite to the passenger seat 74b with respect to the center position ST1 of the driver seat 74a in the width direction DR2. The third blowing outlet 32a is located on a side opposite to the driver seat 74a with respect to the center position ST2 of the passenger seat 74b in the width direction DR2. As a result, air from the air conditioning unit 20 can be blown from the first blowing outlet 11a, the second blowing outlet 30a, and the third blowing outlet 32a into the vehicle compartment widely in the width direction DR2 centering passengers 72a, 72b having the seats 74a, 74b. Therefore, according to the air blowing device of the present disclosure, an air conditioning performance can be secured at the same level as the air blowing device of the Patent Literature 1. That is, improving mountability in a vehicle and securing the air conditioning performance can be obtained at the same time.

According to the present embodiment, the second blowing outlet 30a and the third blowing outlet 32a as the side face outlets are provided. In this way, it is possible to expand the air direction range in the up-down direction toward chests, pits of stomachs, and the like of the seated occupants 72a and 72b and the width direction DR2 in the vehicle compartment. Moreover, it is possible to achieve finely adjusted air blowing such as causing the air from the air conditioning unit 20 to flow out at small air volumes from the second blowing outlet 30a and the third blowing outlet 32a in the foot mode.

According to the present embodiment, air reaching side windows 82a, 82b is easily prevented from being diffused as compared to the air blowing device of Patent Literature 1. As a result, the side windows 82a, 82b can be defogged locally by high-velocity airflow, and energy loss in the defogging can be reduced. Therefore, by causing the second blowing outlet 30a and the third blowing outlet 32a to blow air, it is possible to improve defogging performance for defogging the side windows 82a, 82b (see FIG. 1) in the defroster mode as compared with the air blowing device in Patent Literature 1.

In the air blowing device 10 in the present embodiment, areas of the openings for blowing the air can be made smaller than those of the air blowing device in Patent Literature 1. As a result, a wind speed at which the air is blown becomes higher, which is advantageous in enhancing a sense of speed of the air blown to the occupant and defroster performance (defogging performance).

The first blowing outlet 11a is disposed in the central portion in the vehicle compartment in the width direction DR2. In this way, compared with the air blowing device in Patent Literature 1, the air blowing device 10 has an advantage in that the volume of the air to be blown through between the driver seat 74a and the passenger seat 74b to the rear seat can be easily increased to thereby improve comfort in the rear seat.

The one center blowing unit 101 corresponding to the air blowing device in Patent Literature 1 is provided in the central portion in the width direction DR2. Accordingly, a configuration of the air blowing device 10 as a whole can be simple as compared to a configuration of the air blowing device of Patent Literature 1 in which two air blowing device are arranged in front of the driver seat 74a and the passenger seat 74b respectively. As a result, according to the present embodiment, a manufacturing cost can be cut in half while air conditioning performance for occupants 72a, 72b having the driver seat 74a and the passenger seat 74b can be secured sufficiently. In addition, the air blowing device 10 can be mounted easily in a vehicle regardless whether the vehicle has a steering wheel on the right side or on the left side. As a result, man-hour for designing the air blowing device 10 can be reduced, and thereby a manufacturing cost of the air blowing device 10 can be reduced by using the same components both in the vehicle having a steering wheel on the right side and the vehicle having a steering wheel on the left side.

According to the present embodiment, the first blowing outlet 11a is disposed so as to be divided in the width direction DR2 by the imaginary plane PLcr (see FIG. 1) that passes through the center position CRst between the driver seat 74a and the passenger seat 74b in the width direction DR2 and that divides the vehicle compartment in the width direction DR2. Therefore, as compared with the case in which the first blowing outlet 11a is not arranged as described above, the conditioned air blowing from the first blowing outlet 11a is likely to pass through between the two front seats 74a and 74b to reach the rear seat to appropriately secure comfort in the rear seat in the face mode.

According to the present embodiment, the first blowing outlet 11a is arranged such that the lowermost portion 11b of the first blowing outlet 11a is located above both of the lowermost portion 30b of the second blowing outlet 30a and the lowermost portion 32b of the third blowing outlet 32a. Therefore, as shown in FIG. 4, in the up-down direction DR3, diffusing areas A2 of the air reaching the occupants 72a and 72b from the second blowing outlet 30a and the third blowing outlet 32a are displaced downward from a diffusing area A1 of the air reaching the occupants 72a and 72b from the first blowing outlet 11a. Therefore, it is possible to widely diffuse the air blowing the air blowing device 10 in the up-down direction DR3 in blowing the air toward the occupants 72a and 72b.

In addition, the first blowing outlet 11a has the lowermost portion 11b that is located at the downstream end and the rearmost end in the lowermost portion 11b. The first blowing outlet 11a is arranged such that the lowermost portion 11b is located above the lowermost portion 30b of the second blowing outlet 30a and the lowermost portion 32b of the third blowing outlet 32a. As a result, it is similarly possible to widely diffuse the air blowing from the air blowing device 10 in the up-down direction DR3 in blowing the air toward the occupants 72a and 72b.

According to the present embodiment, the guide surface 14 of the center blowing unit 101 has the protruding shape in the sectional shape viewed in the width direction DR2. In this way, it is easy to curve the high-velocity airflow formed in the rear passage 12b along the guide surface 14 by the Coanda effect in the face mode.

Second Embodiment

Next, the second embodiment will be described. In the present embodiment, points in which the present embodiment is different from the above-described first embodiment will be mainly described. Portions similar to or equivalent to those in the above-described embodiment will not be described or will be described only briefly. The same holds true for the third embodiment and the following embodiments described later.

Figure 8:
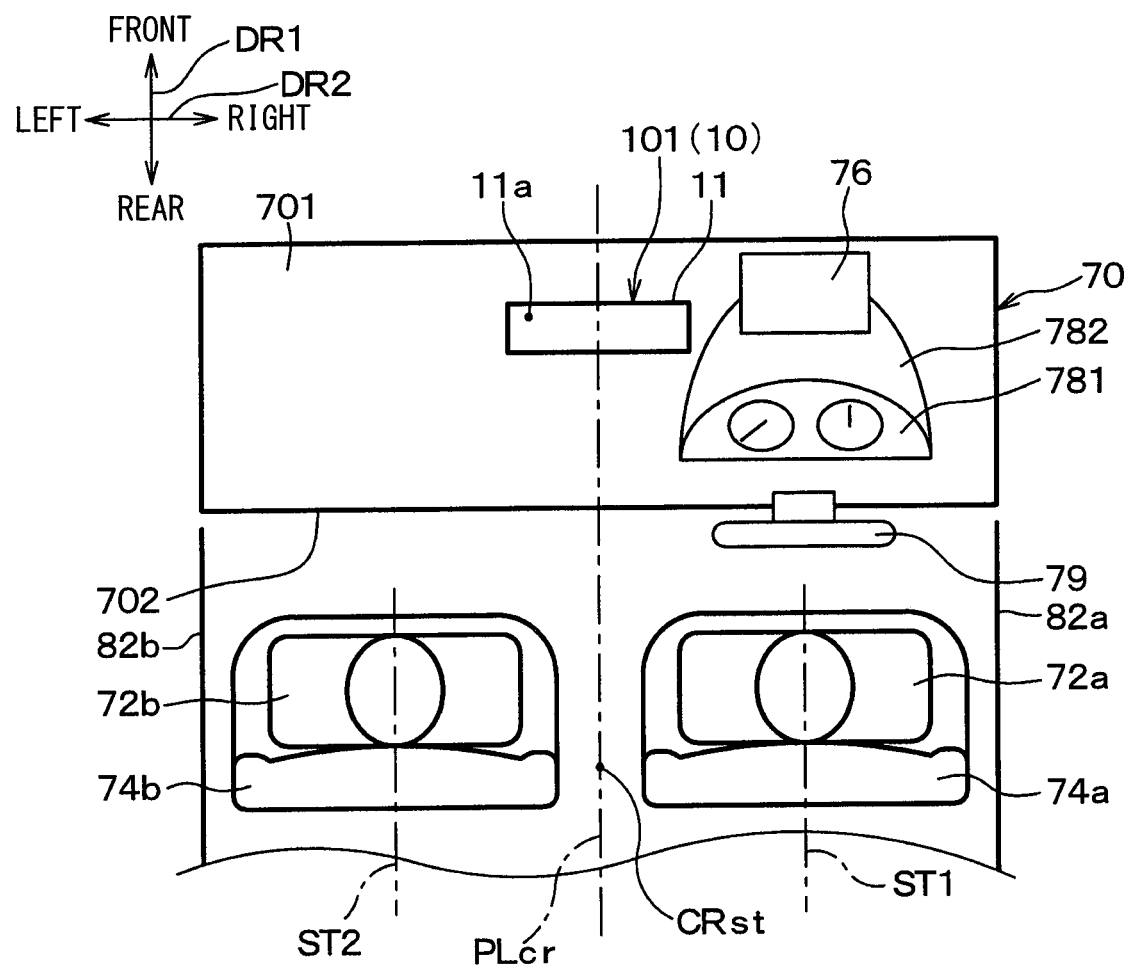
FIG. 8 is a schematic diagram illustrating a front area of a vehicle in a vehicle compartment when viewed from above in a second embodiment and is a diagram corresponding to FIG. 1 in the first embodiment.

FIG. 8 is a schematic diagram illustrating a front area of a vehicle in a vehicle compartment when viewed from above in the present embodiment and is a diagram corresponding to FIG. 1 in the first embodiment. As shown in FIG. 8, the air blowing device 10 in the present embodiment includes the center blowing unit 101 as in the first embodiment and is different from that in the first embodiment in that the right blowing unit 102 and the left blowing unit 103 shown in FIG. 1 are not provided. In other words, the air blowing device 10 in the present embodiment includes only the first blowing portion 11 out of the first blowing portion 11, the second blowing portion 30, and the third blowing portion 32 shown in FIG. 1.

In the present embodiment, similarly to the above-described first embodiment, it is possible to obtain effects exerted by the same structures as those in the first embodiment. For example, since the first blowing outlet 11a exerts the same effect as that in the first embodiment and therefore it is possible to improve ease of mounting of the air blowing device 10 to a vehicle as compared with that of the air blowing device in Patent Literature 1 similarly to the first embodiment.

Moreover, by forming the large first blowing portion 11, it is possible to prevent decrease in air conditioning performance as compared with the air blowing device 10 in the first embodiment or the air blowing device in Patent Literature 1. Accordingly, improving mountability in a vehicle and securing the air conditioning performance can be obtained at the same time.

Third Embodiment

Next, the third embodiment will be described. In the present embodiment, points in which the present embodiment is different from the above-described first embodiment will be mainly described.

Figure 9:
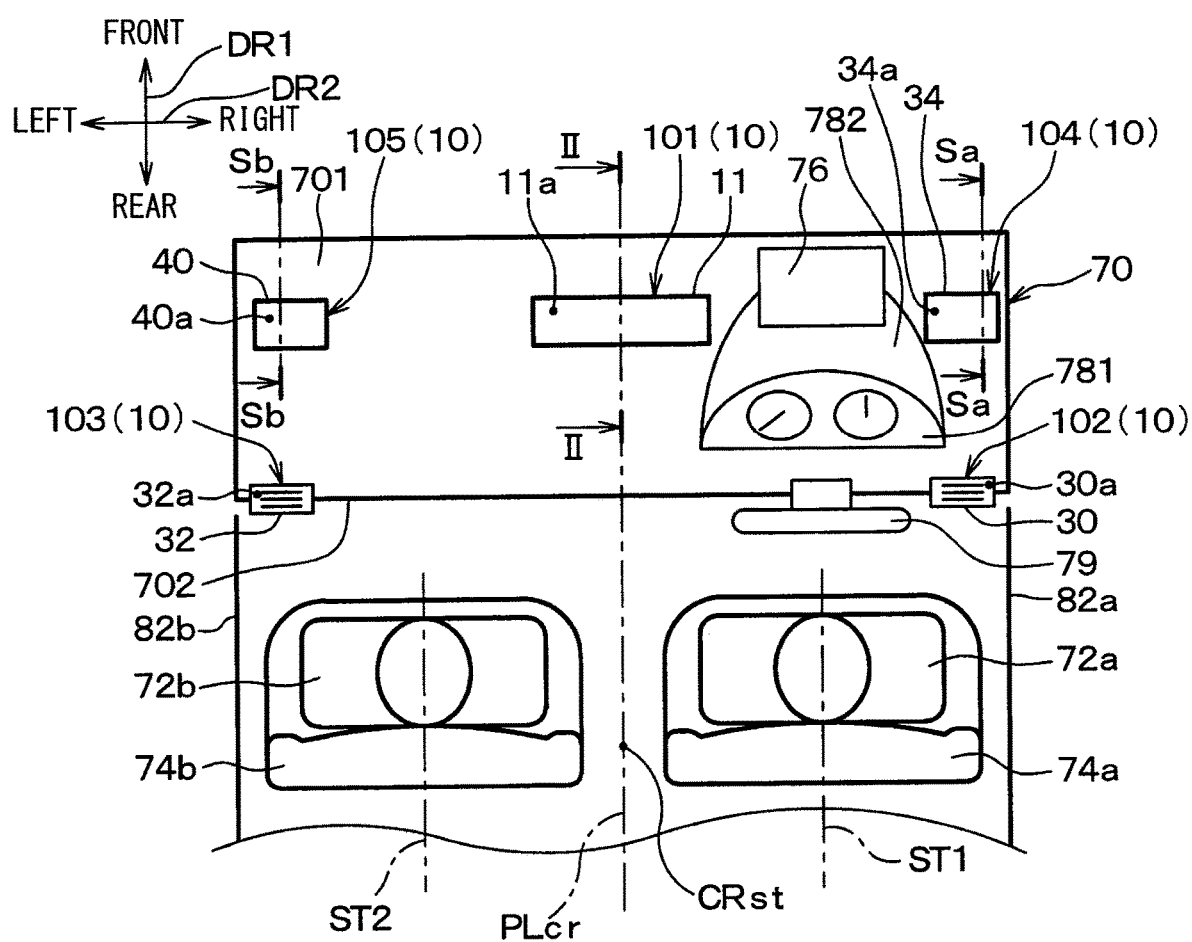
FIG. 9 is a schematic diagram illustrating a front area of a vehicle in a vehicle compartment when viewed from above in a third embodiment and is a diagram corresponding to FIG. 1 in the first embodiment.

FIG. 9 is a schematic diagram illustrating a front area of a vehicle in a vehicle compartment when viewed from above in the present embodiment and is a diagram corresponding to FIG. 1 in the first embodiment. As shown in FIG. 9, the air blowing device 10 in the present embodiment includes a right front blowing unit 104 as a fourth blowing unit and a left front blowing unit 105 as a fifth blowing unit in addition to the center blowing unit 101, the right blowing unit 102, and the left blowing unit 103. The present embodiment is different from the first embodiment in this point.

Each of the right front blowing unit 104 and the left front blowing unit 105 has the same structure as the center blowing unit 101. In other words, a cross-sectional view of the right front blowing unit 104 taken along a line Sa-Sa facing a width direction DR2 in FIG. 9 is similar to that in FIG. 2. A cross-sectional view of the left front blowing unit 105 taken along a line Sb-Sb facing the width direction DR2 is also similar to that in FIG. 2. In the present embodiment, the duct 12 of the center blowing unit 101 is referred to as a first duct 12, the airflow deflection door 13 is referred to as a first airflow causing member or first airflow deflection door 13, the duct air passage 12a is referred to as a first duct air passage 12a, and the guide surface 14 is referred to as a first guide surface 14.

Specifically, as shown in FIG. 2 and FIG. 9, the right front blowing unit 104 has a fourth blowing portion 34, a second duct 36, and a second airflow deflection door 38. The fourth blowing portion 34 is provided with a fourth blowing outlet 34a that blows air from the air conditioning unit 20 into the vehicle compartment. The second duct 36 is connected to the fourth blowing portion 34. The second airflow deflection door 38 is disposed as the second airflow causing member. Similarly, the left front blowing unit 105 has a fifth blowing portion 40, a third duct 42, and a third airflow deflection door 44. The fifth blowing portion 40 is provided with a fifth blowing outlet 40a that blows air from the air conditioning unit 20 into the vehicle compartment. The third duct 42 is connected to the fifth blowing portion 40. The third airflow deflection door 44 is disposed as the third airflow causing member.

Although the fourth blowing portion 34 and the fifth blowing portion 40 are different from the first blowing portion 11 in disposition and size, the fourth blowing portion 34 and the fifth blowing portion 40 have the same structural characteristics as the first blowing portion 11. Therefore, the fourth blowing portion 34 has a second guide surface 341 corresponding to the first guide surface 14 and having the same structural characteristics as the first guide surface 14. The fifth blowing portion 40 has a third guide surface 401 corresponding to the first guide surface 14 and having the same structural characteristics as the first guide surface 14.

In other words, the second guide surface 341 of the fourth blowing portion 34 is provided on the vehicle rear side of the fourth blowing portion 34 in the front-rear direction DR1. In addition, the second guide surface 341 configures a part of the fourth blowing outlet 34a and enlarges the fourth blowing outlet 34a toward a downstream side in a flow direction of air flowing out of the fourth blowing outlet 34a and toward the vehicle rear side in a cross section viewed in the width direction DR2.

The third guide surface 401 of the fifth blowing portion 40 configures a rear portion of the fifth blowing portion 40 in the front-rear direction DR1. In addition, the third guide surface 401 configures a part of the fifth blowing outlet 40a and enlarges the fifth blowing outlet 40a toward a downstream side in a flow direction of air flowing out of the fifth blowing outlet 40a and toward the vehicle rear side in a cross section viewed in the width direction DR2.

Each of the fourth blowing portion 34 and the fifth blowing portion 40 forms a part of the instrument panel 70 similarly to the first blowing portion 11. In other words, the fourth blowing portion 34 forms a portion of the instrument panel 70 around the fourth blowing outlet 34a and the fifth blowing portion 40 forms a portion of the instrument panel 70 around the fifth blowing outlet 40a. Therefore, as shown in FIG. 9, the fourth blowing outlet 34a and the fifth blowing outlet 40a are provided on the upper surface 701 of the instrument panel 70.

As shown in FIGS. 2 and 9, the second duct 36 and the third duct 42 correspond to the first duct 12 and have the same structural characteristics as the first duct 12. Therefore, a second duct air passage 36a for leading the air flowing out of the air conditioning unit 20 to the fourth blowing outlet 34a is formed in the second duct 36. Similarly, a third duct air passage 42a for leading the air flowing out of the air conditioning unit 20 to the fifth blowing outlet 40a is formed in the third duct 42. The second duct air passage 36a and the third duct air passage 42a correspond to the first duct air passage 12a and have the same structural characteristics as the first duct air passage 12a.

The second airflow deflection door 38 and the third airflow deflection door 44 correspond to the first airflow deflection door 13 and have the same structural characteristics as the first duct 12. Therefore, the second airflow deflection door 38 is disposed in the second duct air passage 36a and the third airflow deflection door 44 is disposed in the third duct air passage 42a.

Similarly to the first airflow deflection door 13, the second airflow deflection door 38 and the third airflow deflection door 44 are sliding doors, for example. The second airflow deflection door 38 defines a rear passage (i.e., a third passage) 36b as a part of the second duct air passage 36a. The rear passage 36b is located on the vehicle rear side of the second airflow deflection door 38 in the front-rear direction DR1. The second airflow deflection door 38 further defines a front passage (i.e., a fourth passage) 36c as a part of the second duct air passage 36a. The front passage 36c is located on the vehicle front side of the second airflow deflection door 38 in the front-rear direction DR1. The second airflow deflection door 38 switches the first condition and the second condition to change a flow state of air flowing in the second duct air passage 36a by sliding in the front-rear direction DR1.

The first condition is a condition in which the second airflow deflection door 38 decreases the sectional area of the rear passage 36 to be smaller than the sectional area of the front passage 36c, such that a high-velocity airflow (i.e., a jet flow) is caused in the rear passage 36b and that a low-velocity airflow is caused in the front passage 36c. The high-velocity airflow flows along the second guide surface 341 into the vehicle compartment. The low-velocity airflow flows at a flow velocity lower than that of the high-velocity airflow. The second condition is a condition in which an airflow is caused differently in the second duct air passage 36a as compared to the first condition.

The third airflow deflection door 44 defines a rear passage (i.e., a fifth passage) 42b as a part of the third duct air passage 42a. The rear passage 42b is located on the vehicle rear side of the third airflow deflection door 44 in the front-rear direction DR1. The third airflow deflection door 44 further defines a front passage (i.e., a sixth passage) 42c as a part of the third duct air passage 42a. The front passage 42c is located on the vehicle front side of the third airflow deflection door 44 in the front-rear direction DR1. The third airflow deflection door 44 switches a first condition and a second condition to change a flow state of air flowing in the third duct air passage 42a by sliding in the front-rear direction DR1.

The first condition is a condition in which the third airflow deflection door 44 decreases the sectional area of the rear passage 42b to be smaller than the sectional area of the front passage 42c, such that a high-velocity airflow (i.e., a jet flow) is caused in the rear passage 42b and that a low-velocity airflow is caused in the front passage 42c. The high-velocity airflow flows along the third guide surface 401 into the vehicle compartment. The low-velocity airflow flows at a flow velocity lower than that of the high-velocity airflow. The second condition is a condition in which an airflow is caused differently in the third duct air passage 42a as compared to the first condition.

The fourth blowing outlet 34a and the second blowing outlet 30a are arranged in the front-rear direction DR1, and the fifth blowing outlet 40a and the third blowing outlet 32a are arranged in the front-rear direction DR1. Specifically, the fourth blowing outlet 34a is located on a side opposite to the passenger seat 74b with respect to the center position ST1 of the driver seat 74a in the width direction DR2, and is located on the vehicle rear side of the second blowing outlet 30a in the front-rear direction DR1. The fifth blowing outlet 40a is located on a side opposite to the driver seat 74a with respect to the center position ST2 of the passenger seat 74b in the width direction DR2, and is located on the vehicle rear side of the third blowing outlet 32a in the front-rear direction DR1.

Since the fourth blowing outlet 34a and the fifth blowing outlet 40a are provided in this manner, it is possible to distribute the conditioned air blowing from the air conditioning unit 20 evenly across the vehicle compartment as compared with the air blowing device 10 in the first embodiment. Moreover, in the present embodiment, similarly to the above-described first embodiment, it is possible to obtain effects exerted by the same structures as those in the first embodiment.

The first blowing outlet 11a, the second blowing outlet 30a, the third blowing outlet 32a, the fourth blowing outlet 34a, and the fifth blowing outlet 40a are connected to the air conditioning unit 20 on a condition of being in parallel to each other.

As shown in FIG. 9, the first blowing outlet 11a is greater in width than the second blowing outlet 30a, the third blowing outlet 32a, the fourth blowing outlet 34a, and the fifth blowing outlet 40a in the width direction DR2. Therefore, the air blowing device 10 can blow a largest volume of conditioned air from the front central portion in the vehicle compartment and it is possible to distribute the conditioned air evenly across the entire vehicle compartment in the width direction DR2.

Relative positional relationships of the fourth blowing outlet 34a with the second blowing outlet 30a and the third blowing outlet 32a in the up-down direction DR3 are similar to the relative positional relationships of the first blowing outlet 11a with the second blowing outlet 30a and the third blowing outlet 32a shown in FIG. 4. Similarly, relative positional relationships of the fifth blowing outlet 40a with the second blowing outlet 30a and the third blowing outlet 32a are similar to the relative positional relationships of the first blowing outlet 11a with the second blowing outlet 30a and the third blowing outlet 32a. In other words, the fourth blowing outlet 34a and the fifth blowing outlet 40a have respective lowermost portions corresponding to the lowermost portion 11b of the first blowing outlet 11a. The lowermost portion of the fourth blowing outlet 34a and the lowermost portion of the fifth blowing outlet 40a are located above both of the lowermost portion 30b of the second blowing outlet 30a and the lowermost portion 32b of the third blowing outlet 32a.

Fourth Embodiment

Next, the fourth embodiment will be described. In the present embodiment, points in which the present embodiment is different from the above-described third embodiment will be mainly described.

Figure 10:
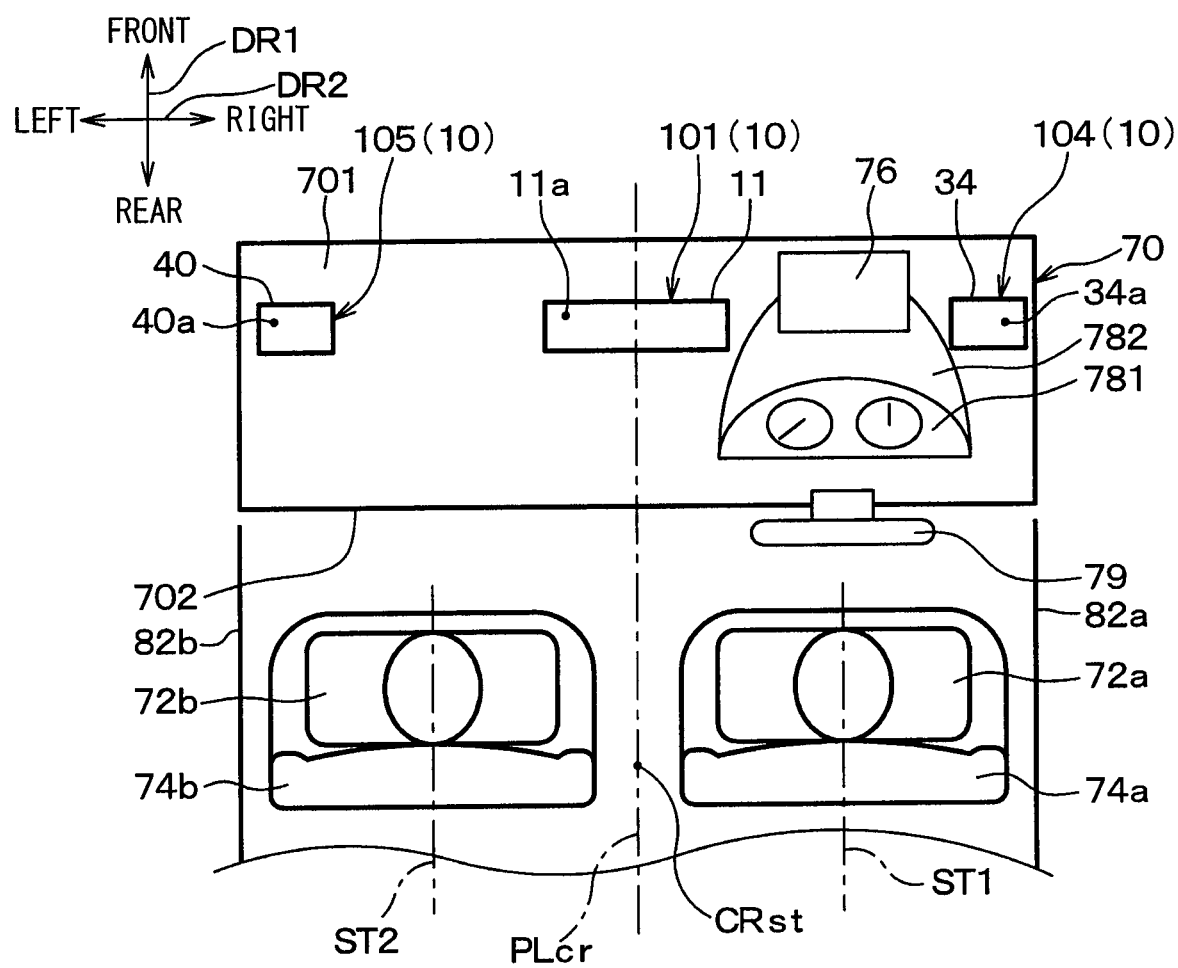
FIG. 10 is a schematic diagram illustrating a front area of a vehicle in a vehicle compartment when viewed from above in a fourth embodiment and is a diagram corresponding to FIG. 9 in the third embodiment.

FIG. 10 is a schematic diagram illustrating a front area of a vehicle in a vehicle compartment when viewed from above in the present embodiment and is a diagram corresponding to FIG. 9 in the third embodiment. As shown in FIG. 10, the air blowing device 10 in the present embodiment includes the center blowing unit 101, the right front blowing unit 104, and the left front blowing unit 105 similarly to the third embodiment. However, the air blowing device 10 in the present embodiment is different from that in the third embodiment in that the air blowing device 10 does not include the right blowing unit 102 and the left blowing unit 103 shown in FIG. 9. In other words, the air blowing device 10 in the present embodiment includes only first, fourth, and fifth blowing portions 11, 34, and 40 out of the first to fifth blowing portions 11, 30, 32, 34, and 40 shown in FIG. 10.

In the present embodiment, similarly to the above-described third embodiment, it is possible to obtain effects exerted by the same structures as those in the third embodiment.

Fifth Embodiment

Next, the fifth embodiment will be described. In the present embodiment, a point in which the present embodiment is different from the above-described second embodiment will be mainly described.

Figure 11:
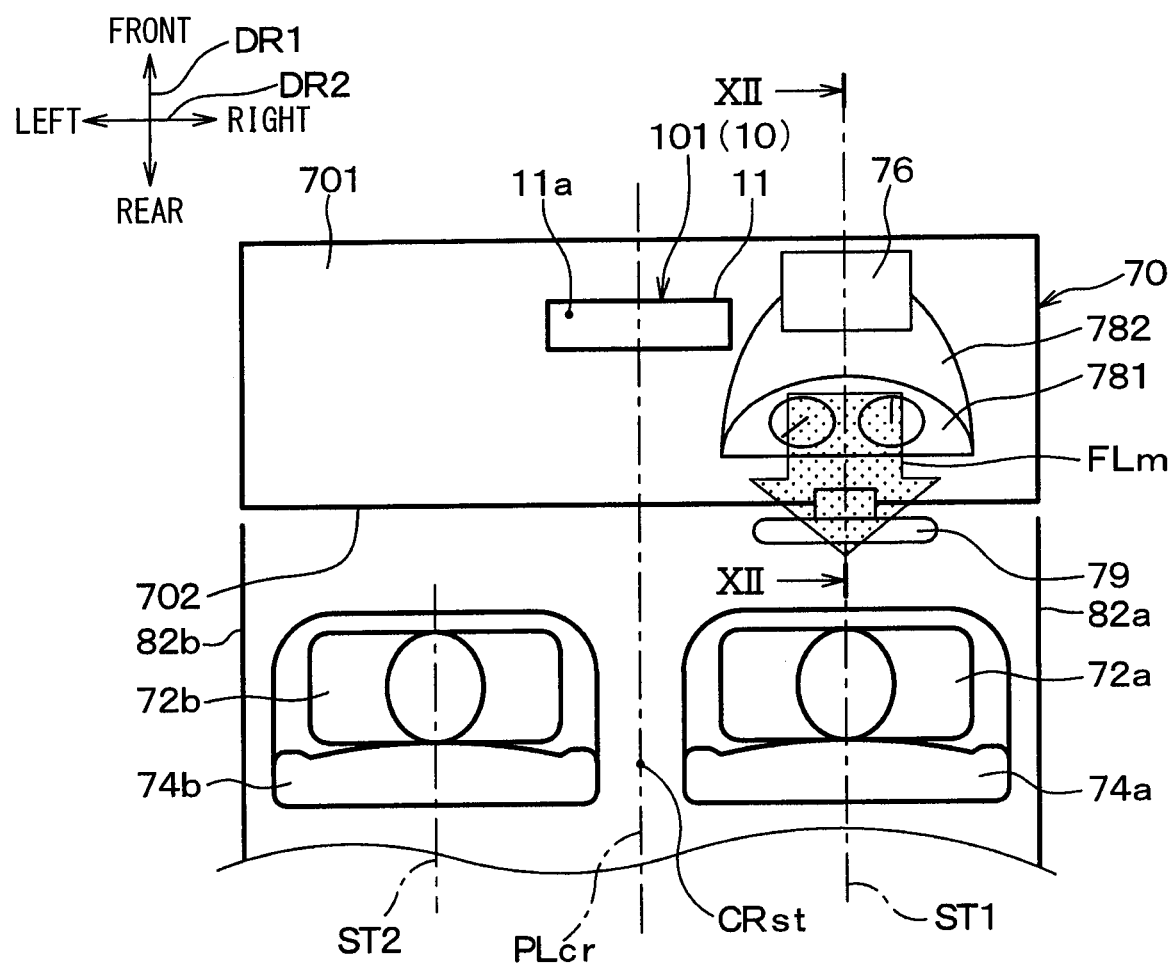
FIG. 11 is a schematic diagram illustrating a front area of a vehicle in a vehicle compartment when viewed from above in a fifth embodiment and is a diagram corresponding to FIG. 8 in the second embodiment.
Figure 12:
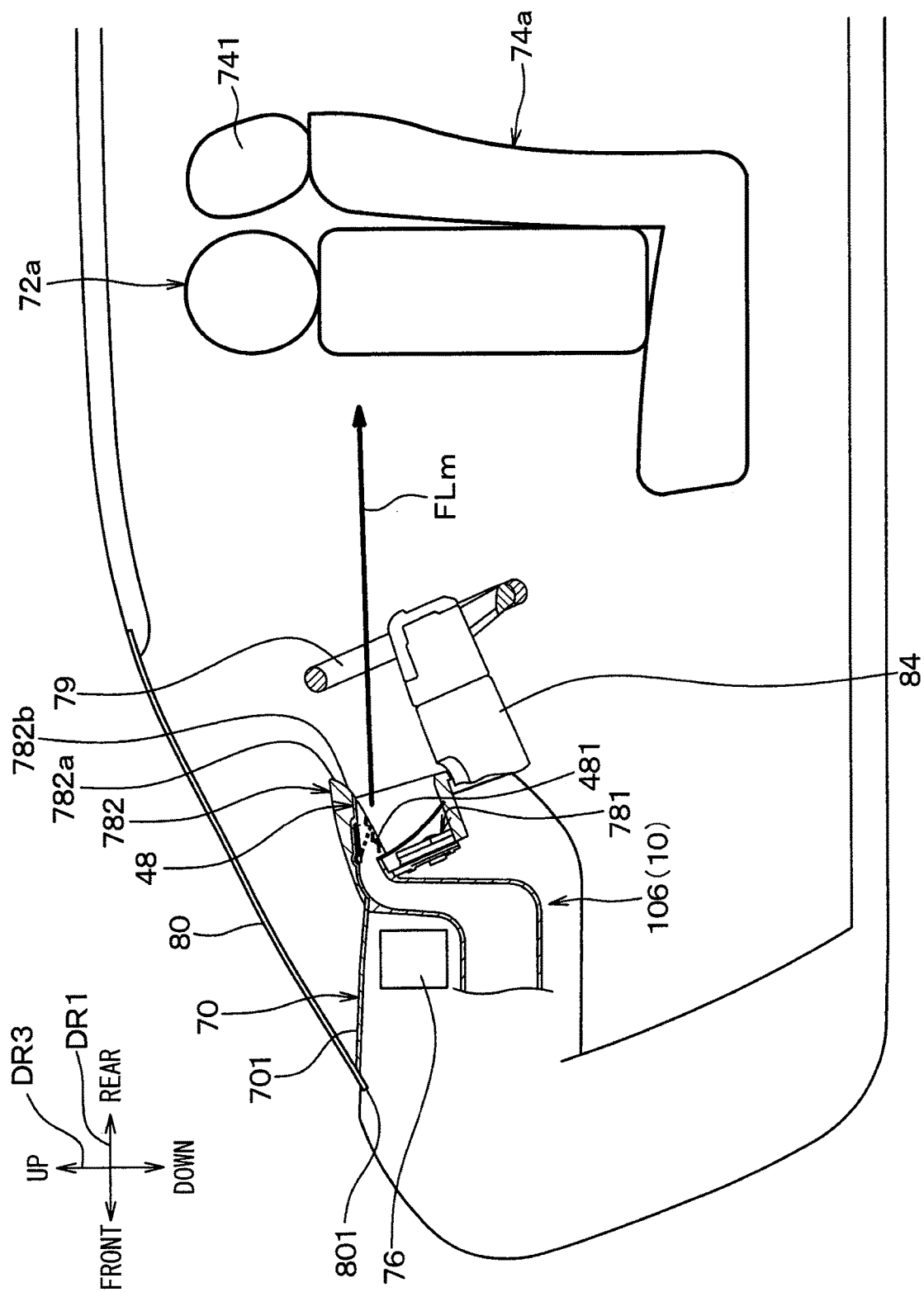
FIG. 12 is a cross-sectional view taken along a line XII-XII in FIG. 11 and is a schematic diagram illustrating disposition of a meter blowing portion provided in an air blowing device in the vehicle compartment in the fifth embodiment and a flow of air blowing from the meter blowing portion into the vehicle compartment.

FIG. 11 is a schematic diagram illustrating a front area of a vehicle in a vehicle compartment when viewed from above in the present embodiment and is a diagram corresponding to FIG. 8 in the second embodiment. FIG. 12 is a cross-sectional view taken along a line XII-XII in FIG. 11 and is a schematic diagram illustrating disposition of a meter blowing portion 48 provided in the air blowing device 10 in the present embodiment in the vehicle compartment and a flow of air blowing from the meter blowing portion 48 into the vehicle compartment.

As shown in FIGS. 11 and 12, the air blowing device 10 in the present embodiment includes a meter blowing unit 106 in addition to the center blowing unit 101. The present invention is different from the second embodiment in this point.

The meter blowing unit 106 is used as parts of a blowing outlet of the air conditioning unit 20 and a duct similarly to the center blowing unit 101. The meter blowing unit 106 is disposed to the instrument panel 70.

Figure 13:
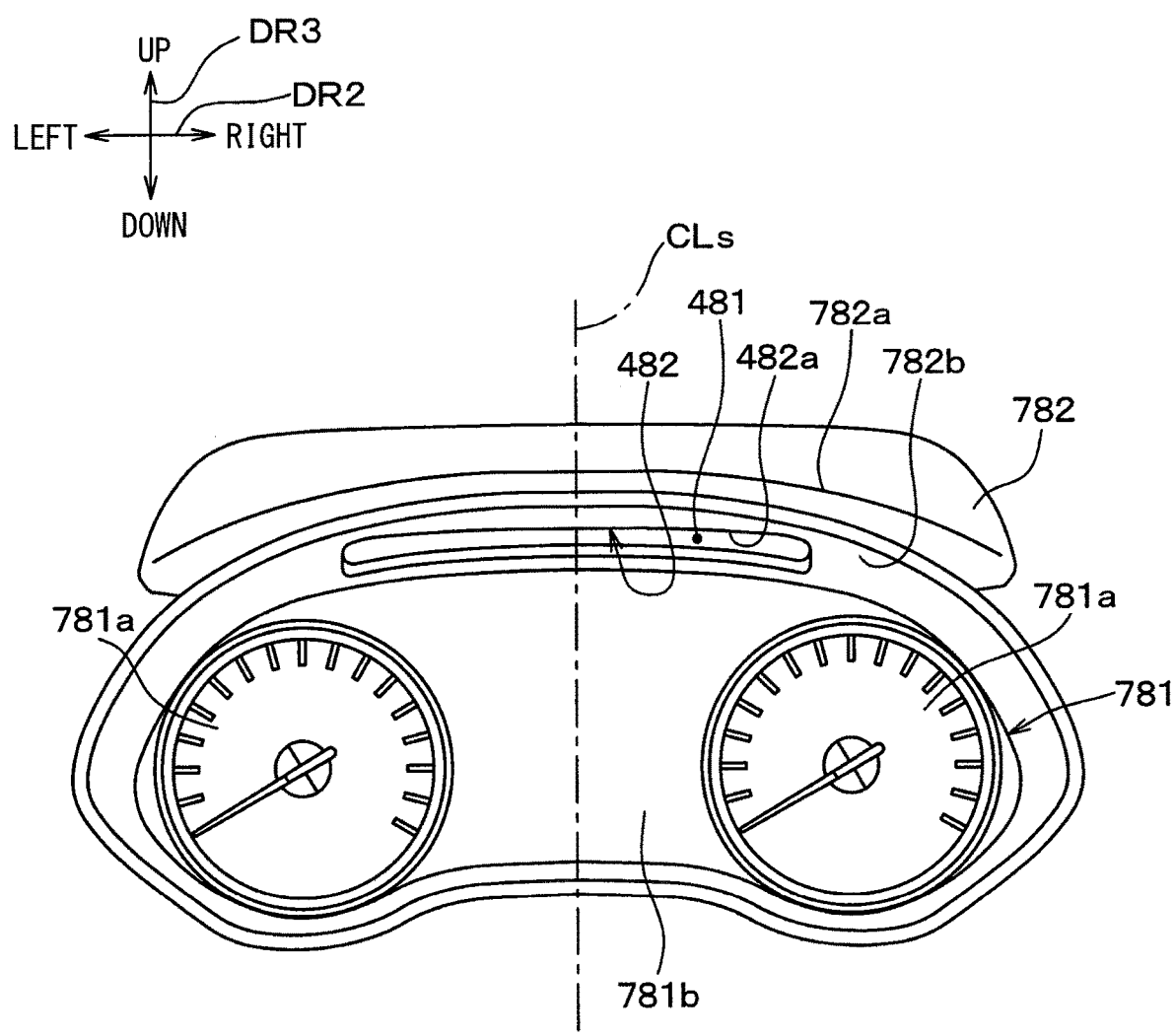
FIG. 13 is a diagram illustrating a dashboard panel and a meter hood viewed from a driver in a driving attitude in the fifth embodiment, in which a steering wheel in FIG. 12 is not shown.

FIG. 13 is a diagram illustrating the dashboard panel 781 and the meter hood 782 viewed from a driver 72a in a driving attitude, in which the steering wheel 79 in FIG. 12 is not shown. As shown in FIGS. 13 and 12, the instrument panel 70 has the dashboard panel 781 as a meter panel including two meters 781a such as a speedometer and a tachometer, and the meter hood 782 for covering an upper side of the dashboard panel 781.

The dashboard panel 781 has the meters 781a and a meter peripheral portion 781b that configures a peripheral portion of the meters 781a. The dashboard panel 781 is arranged such that the meters 781a and the meter peripheral portion 781b are visible when viewing the dashboard panel 781 from the driver seat 74a.

The meter hood 782 is provided to extend in the width direction DR2 on the upper side (i.e., a vehicle upper side) of the dashboard panel 781 and protrudes from the dashboard panel 781 toward the vehicle rear side. Since the meter hood 782 protrudes toward the vehicle rear side, the meter hood 782 has a hood rear end 782a that is located at a rear end in the meter hood 782. The meter hood 782 has a hood lower surface 782b that extends from the hood rear end 782a diagonally downward toward the vehicle front side. The hood lower surface 782b may be a smooth curved face or may have a step.

As shown in FIG. 11 and FIG. 12, the dashboard panel 781 and the meter hood 782 are arranged in front of the driver seat 74a, i.e., on the vehicle front side of the driver seat 74a in the vehicle compartment. A steering column 84 protrudes from a portion of the instrument panel 70 below the dashboard panel 781 toward the driver seat 74a, and the steering wheel 79 is attached to a tip end of the steering column 84.

The steering wheel 79 is disposed between the dashboard panel 781 and the driver seat 74a in the front-rear direction DR1. In other words, the steering wheel 79 is disposed in a position closer to the driver seat 74a than to the dashboard panel 781 and the meter hood 782 and in front of the driver seat 74a. The steering wheel 79 has an annular shape centering on a central axis of the steering column 84, which face diagonally upward toward the vehicle rear side, similarly to a general steering wheel for a vehicle. A center position ST1 of the driver seat 74a, a center position of the dashboard panel 781, and a center position of the meter hood 782 are coincide with a center position CLs (see FIG. 13) of the steering wheel 79 in the width direction DR2.

Figure 14:
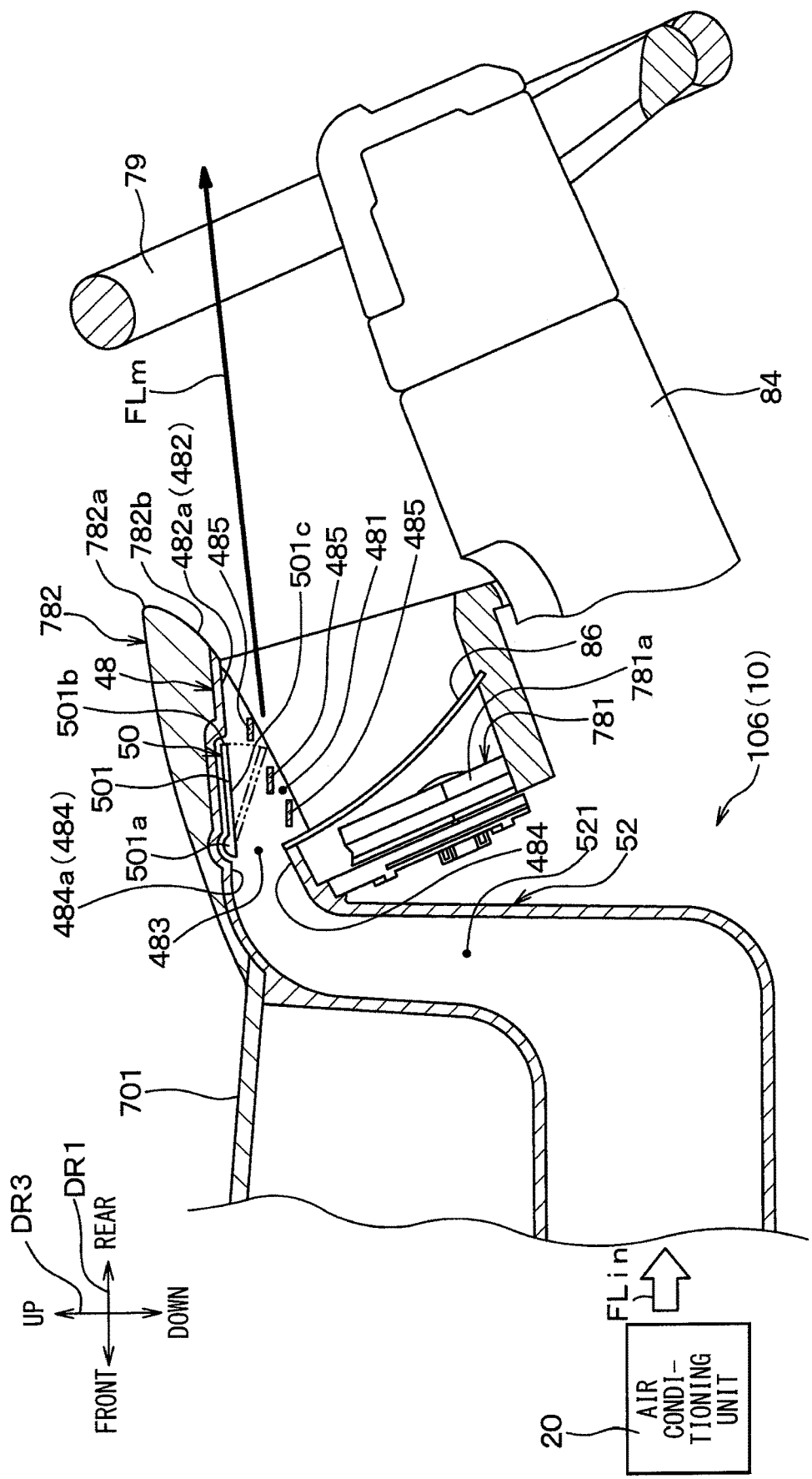
FIG. 14 is an enlarged detail view illustrating a meter blowing unit and component elements near the unit excerpted from FIG. 12.

FIG. 14 is an enlarged detail view of the meter blowing unit 106 and component elements near the unit excerpted from FIG. 12. The meter blowing unit 106 and the steering wheel 79 in FIG. 14 are shown in a section orthogonal to the width direction DR2 (see FIG. 13). In FIG. 14, the HUD 76 is not shown.

As shown in FIG. 14, the meter blowing unit 106 includes the meter blowing portion 48 for blowing the air from the air conditioning unit 20, a meter blowing outlet door 50, and a meter blowing duct portion 52.

The meter blowing portion 48 is integrally provided with the meter hood 782 and has a meter blowing outlet 481. The meter blowing outlet 481 is open so as to blow the air from the air conditioning unit 20 toward the vehicle rear side. Specifically, the meter blowing outlet 481 is open in the hood lower surface 782b of the meter hood 782. The meter blowing outlet 481 is provided on the vehicle rear side of an upper end of a transparent meter window 86 disposed on the vehicle rear side of the dashboard panel 781.

Moreover, the meter blowing outlet 481 is open so as to blow the air from the air conditioning unit 20 toward the vehicle rear side through an inner side of the steering wheel 79 as shown by an arrow FLm. The arrow FLm shows a main flow of the air blowing from the meter blowing outlet 481. The main flow of the air just reach the driver 72a through the inner side of the steering wheel 79 and not all of the air needs to flow through the inner side of the steering wheel 79.

The meter window 86 is made of a material such as a transparent acrylic plate and is so-called an anti-reflective plate that suppresses reflection toward the driver 72a (see FIG. 12). The meter window 86 is warped downward such that a lower end of the meter window 86 is located on the vehicle rear side of the upper end. The downward warp of the meter window 86 improves ease of mounting of the meter blowing portion 48.

Specifically, as shown in FIGS. 13 and 14, the meter blowing outlet 481 is open in the hood lower surface 782b toward the vehicle rear side and disposed symmetrically with respect to the center position CLs of the steering wheel 79 in the width direction DR2. The meter blowing outlet 481 is open to be thin in the up-down direction DR3 and wide in the width direction DR2, for example. In this way, the meter blowing portion 48 can blow an airflow that is symmetric with respect to the center position CLs of the steering wheel 79 in the width direction DR2, toward the driver 72a.

As shown in FIG. 14, a blown air passage 483 extending from the meter blowing outlet 481 toward the vehicle front side is defined in the meter blowing portion 48. The air from the air conditioning unit 20 flows into the blown air passage 483, and the blown air passage 483 allows the air to flow to the meter blowing outlet 481.

In other words, the meter blowing portion 48 includes a blowing outlet peripheral edge portion 482 forming a peripheral edge of the meter blowing outlet 481 and a passage inner wall surface 484 formed to surround the blown air passage 483. The passage inner wall surface 484 extends from the blowing outlet peripheral edge portion 482 toward the vehicle front side. In addition, the passage inner wall surface 484 inclines such that a front end of the passage inner wall surface 484 in the front-rear direction DR1 is located on a lower side of a rear end. Specifically, the passage inner wall surface 484 is formed such that an upper portion 484a of the passage inner wall surface 484 extends diagonally downward toward the vehicle front side from an upper portion 482a of the blowing outlet peripheral edge portion 482.

The meter blowing portion 48 has thin plate-shaped blowing outlet ribs 485. The blowing outlet ribs 485 are disposed in the meter blowing outlet 481 with thicknesses in a direction orthogonal to the flow direction (see the arrow FLm) of air blowing from the meter blowing outlet 481 to extend across the meter blowing outlet 481 in the width direction DR2. In this way, the blowing outlet ribs 485 prevent entry of foreign material from the meter blowing outlet 481 in the meter blowing portion 48 while not preventing the flow of the air blowing from the meter blowing outlet 481.

The meter blowing outlet door 50 is a blowing direction adjusting device that is disposed in the meter blowing portion 48 and that adjusts a blowing direction of the air blowing from the meter blowing outlet 481. The blowing direction of the air blowing from the meter blowing outlet 481 is the direction shown by the arrow FLm in FIG. 14, for example.

Specifically, the meter blowing outlet door 50 has an air guide member 501 having a flat plate shape and the air guide member 501 is disposed to extend substantially in the front-rear direction DR1 and the width direction DR2. The air guide member 501 has a front end portion 501a located on the vehicle front side of the air guide member 501. The meter blowing outlet door 50 adjusts the blowing direction by turning operation of the air guide member 501 and the front end portion 501a of the air guide member 501 serves as a turning center of the air guide member 501.

The air guide member 501 slightly turns with respect to a horizontal direction of the air guide member 501. For example, the air guide member 501 turns within a turning range from an upper position of the air guide member 501 shown by a solid line and a lower position shown by a two-dot chain line in FIG. 14 under electric control of an electronic control unit (not shown). Therefore, by turning of the air guide member 501 about the front end portion 501a, a rear end portion 501b on an opposite side from the front end portion 501a in the front-rear direction DR1 moves up and down.

The air guide member 501 is disposed close to an upper side in the blown air passage 483. Specifically, a portion of the upper portion 484a of the passage inner wall surface 484 is recessed upward and the air guide member 501 is disposed so that an upper side of the air guide member 501 is fitted in the recessed portion. For example, the air guide member 501 is disposed along the upper portion 484a of the passage inner wall surface 484 as shown in FIG. 14 in the upper position where the rear end portion 501b of the air guide member 501 is positioned at an uppermost position.

Therefore, a lower plain face, i.e., a lower surface of the air guide member 501 serves as an air guide surface 501c along which the air blowing from the meter blowing outlet 481 flows. In other words, the meter blowing outlet door 50 adjusts the blowing direction of the air blowing from the meter blowing outlet 481 by changing an angle of the lower surface as the air guide surface 501c.

Figure 15:
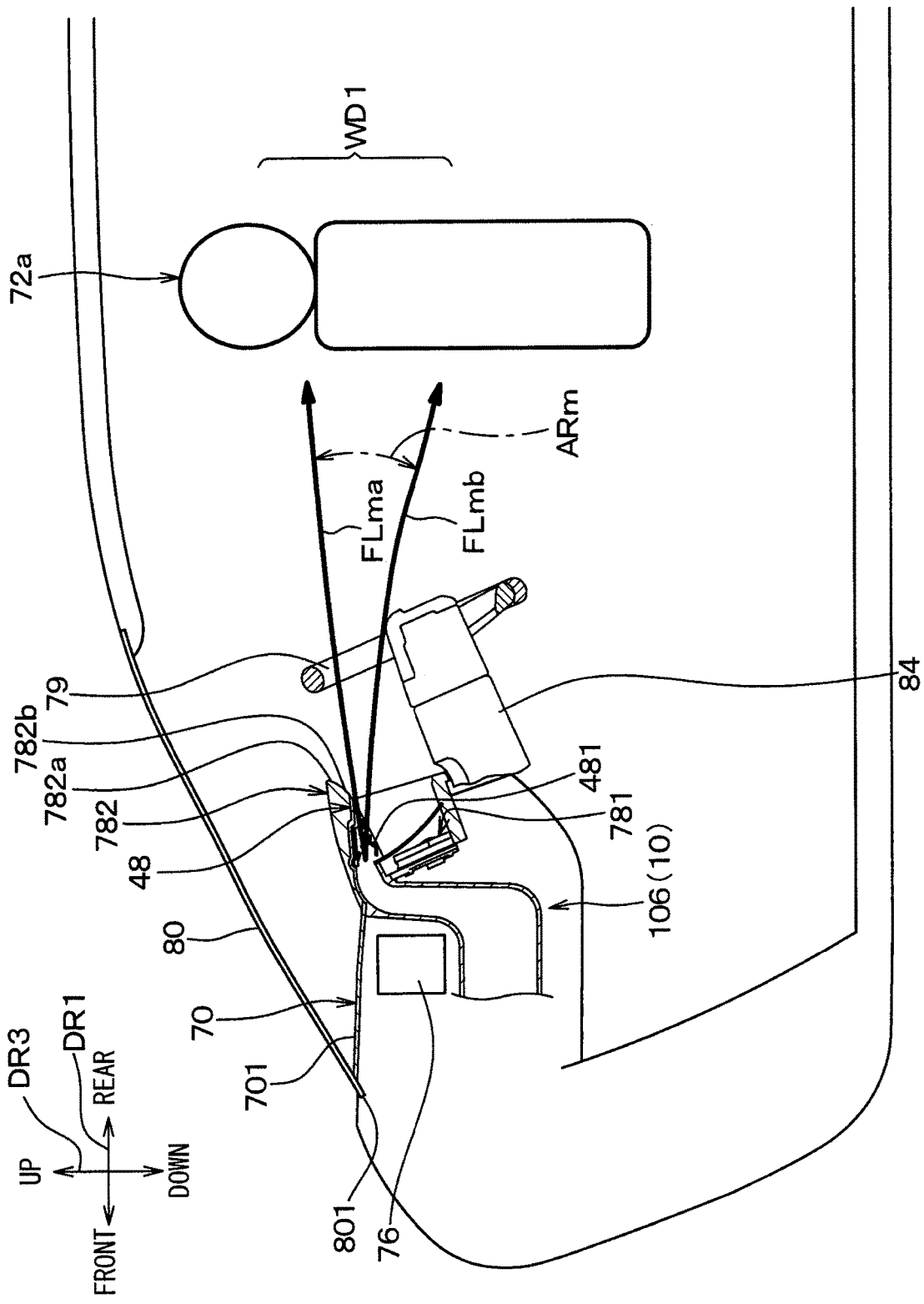
FIG. 15 is a side view similar to FIG. 12 and illustrating an air blowing range of air blowing from the meter blowing unit into the vehicle compartment.

Specifically, the air guide member 501 turns about the front end portion 501a to thereby adjust the blowing direction of the air blowing from the meter blowing outlet 481 upward and downward as shown by an arrow ARm in FIG. 15. For example, the air from the meter blowing outlet 481 is blown into an air direction range WD1 from a face to a part including a pit of a stomach of the driver 72a by the adjustment of the meter blowing outlet door 50. FIG. 15 is a side view similar to FIG. 12 and illustrating an air blowing range of the air blowing from the meter blowing unit 106 into the vehicle compartment. An arrow FLma shows an air flow flowing on an uppermost side of the air blowing range of the meter blowing portion 48 (i.e., a blowing range of the meter blowing portion 48) and an arrow FLmb shows an air flow flowing on a lowermost side of the air blowing range of the meter blowing portion 48.

The meter blowing outlet door 50 in any position in the movable range from the upper position to the lower position is not visually recognized by the driver 72a in the driving attitude (see FIG. 12). For example, the meter blowing outlet 481 and the meter blowing outlet door 50 rotating in the meter blowing outlet 481 are disposed so as to be hidden by the steering wheel 79 and the meter hood 782 when viewed from a headrest 741 (see FIG. 12) that supports a back of a head of the driver 72a and that configures an upper end portion of the driver seat 74a.

The meter blowing duct portion 52 shown in FIG. 14 is an intermediate duct portion disposed between the meter blowing portion 48 and an air blowing outlet of the air conditioning unit 20. That is, the meter blowing duct portion 52 therein defines a meter blowing duct passage 521 that is an air passage guiding air from the air conditioning unit 20. The meter blowing duct passage 521 is provided on an upstream side in an air flow direction of the blown air passage 483 in the meter blowing portion 48. In this way, the air from the air conditioning unit 20 flows into the meter blowing duct passage 521 as shown by an arrow FLin and the meter blowing duct portion 52 allows the air flowing into the meter blowing duct passage 521 to flow to the blown air passage 483.

The meter blowing duct portion 52 is disposed so as to allow the air to flow upward from a lower side in a terminal portion of the meter blowing duct portion 52 connected to the blown air passage 483 of the meter blowing portion 48. The meter blowing duct portion 52 is arranged on the vehicle front side of the dashboard panel 781. In other words, the meter blowing duct portion 52 overlaps with the dashboard panel 781 in front of the dashboard panel 781.

As described above, according to the present embodiment, the meter blowing outlet 481 is formed in the meter blowing portion 48 and the meter blowing outlet 481 is open in the meter hood 782 so as to blow the air from the air conditioning unit 20 toward the vehicle rear side through the inner side of the steering wheel 79 as shown in FIG. 14. Therefore, it is possible to blow the air from the meter blowing outlet 481 that is open widely as shown in FIG. 13 near the driver 72a. Therefore, it is possible to blow the air at a sufficient air volume toward the driver 72a from the position in front of the driver 72a.

For example, in the present embodiment, because the meter blowing outlet 481 is open in the hood lower surface 782b of the meter hood 782, it is easy to secure the meter blowing outlet 481 having a larger size and it is possible to blow the airflow from the meter blowing outlet 481 while suppressing a diffusion loss. Therefore, it is possible to improve performance in causing cold air to reach the driver 72a in air conditioning to thereby obtain greater rapid-cooling effect. In other words, it is easy to secure the large opening of the meter blowing outlet 481 to thereby easily achieve large-volume air blowing.

As shown in FIG. 14, the meter blowing outlet door 50 adjusts the blowing direction of the air blowing from the meter blowing outlet 481 by changing the angle of the air guide surface 501c. Therefore, it is possible to adjust the air blowing direction while securing the large volume of air blowing from the meter blowing outlet 481. As a result, the air from the meter blowing outlet 481 can be blown not only to a certain body part of the driver 72a, but also to a wide range (e.g., the air direction range WD1 in FIG. 15) of the driver 72a.

It is possible to prevent the air blowing from the meter blowing outlet 481 from being directed to eyes of the driver 72a by adjusting the meter blowing outlet door 50. Thus, performance in rapidly cooling of a face or a head of the driver 72a can be improved without impairing comfort of the driver 72a.

According to the present embodiment, as shown by the arrow FLm in FIG. 11, it is possible to blow, from the meter blowing portion 48 (see FIG. 14), the air straight and over a shorter distance than the airflow from the other air blowing outlet through the inner side of the steering wheel 79. Therefore, it is possible to minimize an influence of the diffusion loss of the airflow due to an obstacle to thereby improve the performance in rapidly cooling of the driver 72a in the air conditioning.

According to the present embodiment, as shown in FIG. 13 and FIG. 14, the hood lower surface 782b of the meter hood 782 is provided on the lower side of the hood rear end 782a to extend diagonally downward toward the vehicle front side. The meter blowing outlet 481 is open in the hood lower surface 782b toward the vehicle rear side. Therefore, the meter blowing outlet 481 can directly blow the air to the driver 72a. The meter blowing outlet 481 is hidden by the steering wheel 79 and the meter hood 782 and cannot be seen directly from the driver 72a in the driving attitude. Therefore, the meter blowing unit 106 in the present embodiment is excellent in design.

Figure 16:
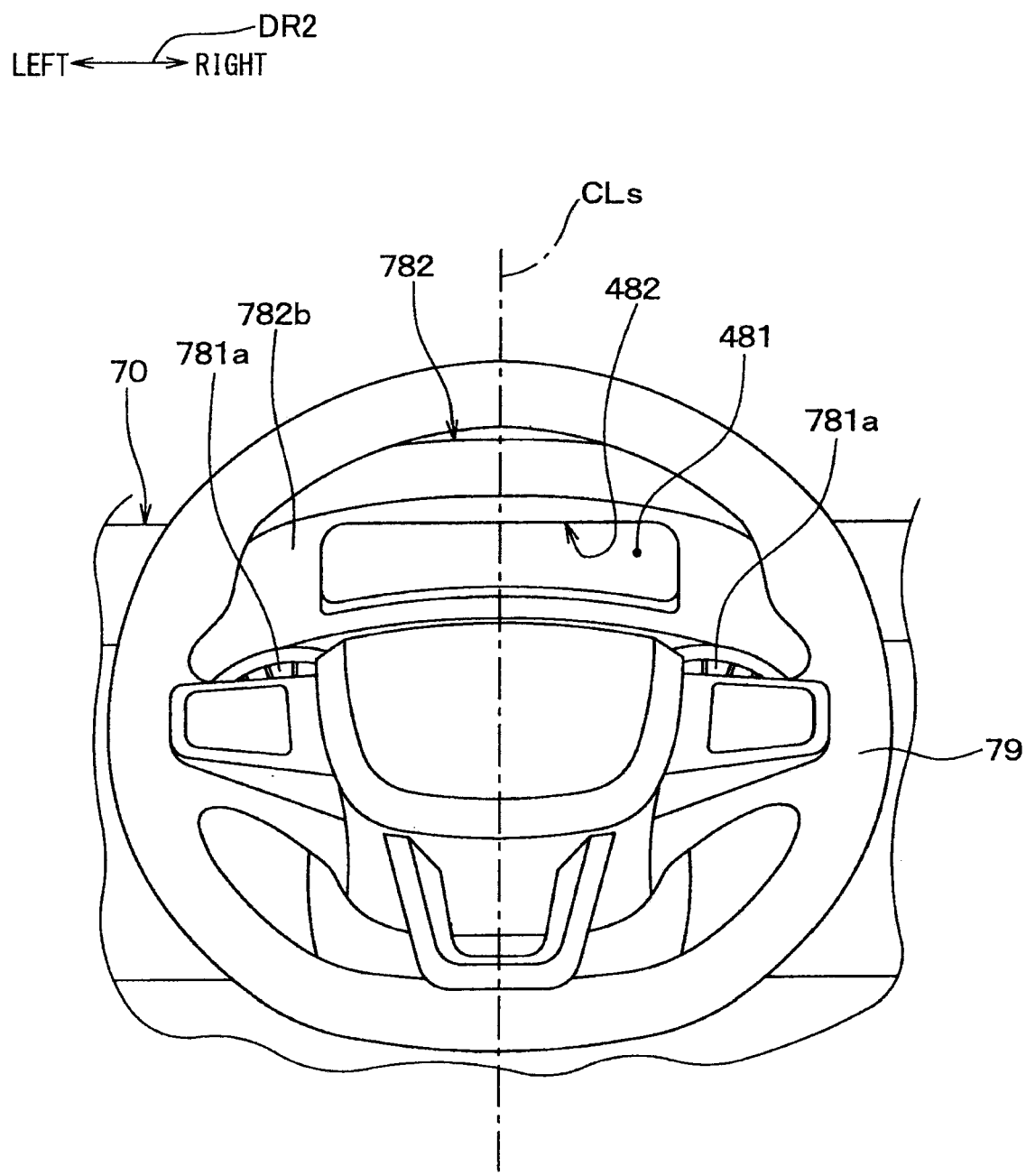
FIG. 16 is a view illustrating the dashboard panel, the meter hood, and the steering wheel in the fifth embodiment from a position in a driver seat lower than the steering wheel.

Although the meter blowing outlet 481 is visually recognized as shown in FIG. 16 when viewed from a position in the driver seat 74a lower than the steering wheel 79, the occupant does not normally see in this manner and therefore the design is not impaired. FIG. 16 is a view of the dashboard panel 781, the meter hood 782, and the steering wheel 79 from the position in the driver seat 74a lower than the steering wheel 79.

The hood lower surface 782b in which the meter blowing outlet 481 is open is a surface extending diagonally downward toward the vehicle front side on the lower side of the hood rear end 782a as shown in FIG. 14. Therefore, the meter blowing outlet 481 can be hidden from the driver 72a in the driving attitude by the meter hood 782 and the meter blowing outlet 481 is less likely to allow the entry of foreign material than the meter blowing outlet 481 that is open in an upward face.

According to the present embodiment, the air guide member 501 of the meter blowing outlet door 50 is disposed close to the upper side in the blown air passage 483. Therefore, it is possible to adjust the blowing direction of the air blowing from the meter blowing outlet 481 with the meter blowing outlet door 50 while hiding the meter blowing outlet door 50 from the driver 72a in the driving attitude.

According to the present embodiment, the passage inner wall surface 484 of the meter blowing portion 48 is provided such that the upper portion 484a of the passage inner wall surface 484 extends diagonally downward toward the vehicle front side from the upper portion 482a of the blowing outlet peripheral edge portion 482. Therefore, it is possible to raise an upper limit of the air blowing range (i.e., air direction range WD1 in FIG. 15) of the meter blowing portion 48 as compared with a structure in which the upper portion 484a of a passage inner wall surface 484 extends horizontally, for example). For example, the upper limit is raised to an area around the face of the driver 72a in the present embodiment.

According to the present embodiment, the meter blowing duct portion 52 is arranged on the vehicle front side of the dashboard panel 781. As a result, it is easy to configure the meter blowing portion 48 and the meter blowing duct portion 52 integrally with the dashboard panel 781 to form the meter blowing portion 48, the meter blowing duct portion 52, and the dashboard panel 781 as a single unit.

Moreover, according to the present embodiment, the blowing outlet ribs 485 are disposed to extend across the meter blowing outlet 481 while not obstructing the flow of blowing from the meter blowing outlet 481 to prevent the entry of the foreign material from the meter blowing outlet 481 in the meter blowing portion 48. Therefore, it is possible to prevent the entry of the foreign material into the meter blowing unit 106.

Since the blowing outlet ribs 485 are disposed in the meter blowing outlet 481, it is possible to prevent the entry of the foreign material without affecting visual recognition of the meters 781a and the like of the dashboard panel 781 by the driver 72a.

In the present embodiment, similarly to the above-described second embodiment, it is possible to obtain effects exerted by the same structures as those in the second embodiment. Although the present embodiment is a variation of the second embodiment, the present embodiment can be combined with any of the above-described first, third, and fourth embodiments.

Sixth Embodiment

Next, a sixth embodiment will be described. In the present embodiment, points in which the present embodiment is different from the above-described third embodiment will be mainly described.

Figure 17:
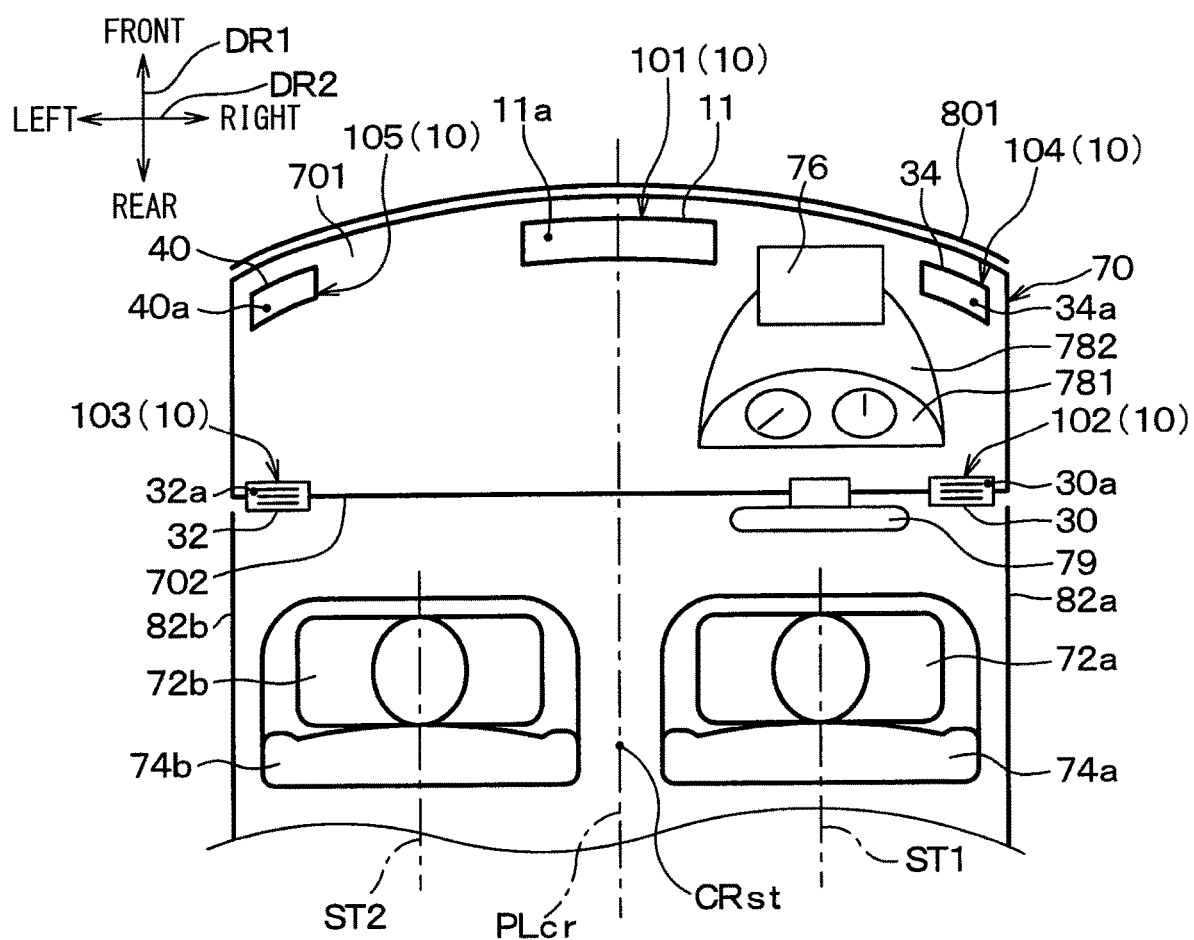
FIG. 17 is a schematic diagram illustrating a front area of a vehicle in a vehicle compartment when viewed from above in a sixth embodiment and is a diagram corresponding to FIG. 9 in the third embodiment.

FIG. 17 is a schematic diagram illustrating a front area of a vehicle in a vehicle compartment when viewed from above in the present embodiment and is a diagram corresponding to FIG. 9 in the third embodiment. As shown in FIG. 17, in the air blowing device 10 of the present embodiment, shapes of the first blowing outlet 11a, the fourth blowing outlet 34a, and the fifth blowing outlet 40a when viewed from the vehicle upper side are different from those in the third embodiment.

Specifically, as shown in FIG. 17 and FIG. 12, the windshield glass 80 (i.e., windshield) has a window lower end portion 801 configuring a lower end edge of the windshield glass 80. The window lower end portion 801 is curved such that a central portion of the window lower end portion 801 in a width direction DR2 bulges toward the vehicle front side when viewed in an up-down direction DR3 as shown in FIG. 17.

The first blowing outlet 11a, the fourth blowing outlet 34a, and the fifth blowing outlet 40a are arranged on the vehicle rear side of the window lower end portion 801 in the upper surface 701 of the instrument panel 70. At the same time, the first blowing outlet 11a, the fourth blowing outlet 34a, and the fifth blowing outlet 40a viewed in the up-down direction DR3 are arranged in series along the window lower end portion 801. Moreover, each of the first blowing outlet 11a, the fourth blowing outlet 34a, and the fifth blowing outlet 40a viewed in the up-down direction DR3 is in a shape curved along the window lower end portion 801. For example, with regard to the first blowing outlet 11a, the first blowing outlet 11a viewed in the up-down direction DR3 has a curved shape in which a central portion of the first blowing outlet 11a bulges toward the vehicle front side.

As described above, according to the present embodiment, each of the first blowing outlet 11a, the fourth blowing outlet 34a, and the fifth blowing outlet 40a is in the shape curved along the window lower end portion 801. Therefore, it is possible to improve design of the upper surface 701 of the instrument panel 70 provided with the first blowing outlet 11a, the fourth blowing outlet 34a, and the fifth blowing outlet 40a as compared with a case that blowing outlet 11a, 34a, and 40a have shapes irrelevant to the window lower end portion 801.

In the present embodiment, similarly to the above-described third embodiment, it is possible to obtain effects exerted by the same structures as those in the third embodiment. Although the present embodiment is a variation of the third embodiment, the present embodiment can be combined with any of the above-described first, second, fourth, and fifth embodiments.

Other Embodiments (1) In each of the above-described embodiments, the blowing mode of the air blowing device 10 can be switched between the face mode shown in FIG. 3 and the defroster mode shown in FIG. 6. However, the blowing mode may be switched to a mode other than the face mode and the defroster mode.

For example, the blowing mode may be also switched to an upper vent mode in addition to the face mode and the defroster mode. In the upper vent mode, the airflow deflection door 13 is in a position between the position of the airflow deflection door 13 in the face mode shown in FIG. 2 and the position of the airflow deflection door 13 in the defroster mode shown in FIG. 5. In this case, the airflow in the duct air passage 12a is in the above-described first condition. However, a velocity of a high-velocity airflow formed in the rear passage 12b is lower than in the face mode and therefore a blowing angle θ (see FIG. 2) is smaller than in the face mode.

Figure 18:
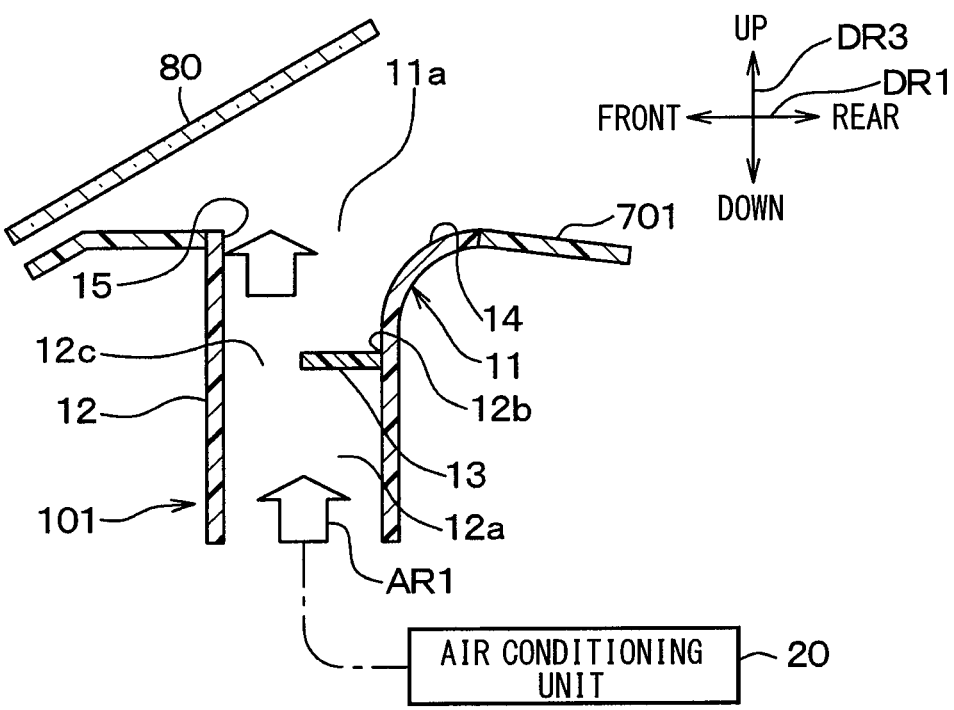
FIG. 18 is a cross-sectional view taken along a line II-II in FIG. 1 and illustrating a state where an airflow deflection door is positioned in a defroster mode in a first variation of the first embodiment shown in FIG. 1.

(2) When the blowing mode is the defroster mode in each of the above-described embodiments, the airflow deflection door 13 is in the position shown in FIG. 5. However, the airflow deflection door 13 may be in a position shown in FIG. 18. FIG. 18 is a cross-sectional view taken along a line II-II in FIG. 1 and illustrating a state where the airflow deflection door 13 is positioned in a defroster mode in a first variation of the above-described first embodiment.

In FIG. 18, the airflow deflection door 13 is located to fully close the rear passage 12b and fully open a front passage 12c. In this way, an air flow in the duct air passage 12a is in a second condition different from a first condition, in which the rear passage 12b is not formed and the front passage 12c is formed. In this case, similarly to the air flow shown in FIG. 5, a high-velocity airflow bending along the guide surface 14 is not formed in the rear passage 12b and therefore air (e.g., warm air) flowing out of the air conditioning unit 20 is blown toward the windshield glass 80 from the first blowing outlet 11a.

Alternatively, the airflow deflection door 13 may be located on a side opposite from the position shown in FIG. 18 to fully close the front passage 12c and fully open the rear passage 12b. In this case, an air flow in the duct air passage 12a comes into a state where only one of the rear passage 12b and the front passage 12c is formed and specifically, the state where the front passage 12c is not formed and the rear passage 12b is formed. In short, the air flow in the duct air passage 12a is in the second condition different from the first condition. In this case, the high-velocity airflow bending along the guide surface 14 is not formed in the rear passage 12b similarly to the air flow shown in FIG. 5. Therefore, the air (e.g., warm air) flowing out of the air conditioning unit 20 is blown toward the windshield glass 80 from the first blowing outlet 11a.

Figure 19:
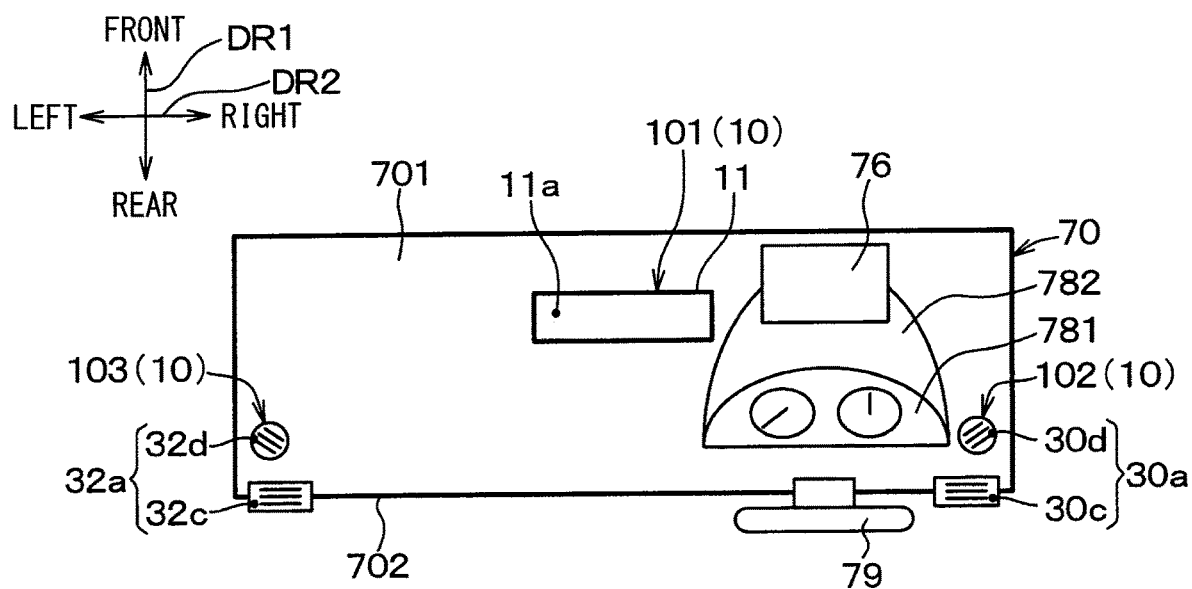
FIG. 19 is a schematic diagram illustrating an instrument panel in a vehicle compartment when viewed from above in a second variation of the first embodiment shown in FIG. 1.

(3) In the above-described first embodiment, the second blowing outlet 30a and the third blowing outlet 32a are formed as the side face outlet for the driver seat and the side face outlet for the passenger seat respectively. However, each of the second blowing outlet 30a and the third blowing outlet 32a may be provided with two blowing outlets as shown in FIG. 19. The same holds true for the third and sixth embodiments. FIG. 19 is a schematic diagram illustrating the instrument panel 70 in a vehicle compartment when viewed from the vehicle upper side in a second variation of the above-described first embodiment.

In the variation in FIG. 19, the second blowing outlet 30a positioned on the side of the driver seat includes a side face outlet 30c and a side defroster outlet 30d. The side face outlet 30c can blow air toward the driver seat 74a. The side defroster outlet 30d blows the air toward driver seat side window 82a (see FIG. 1) as first side window disposed on an opposite side of the driver seat 74a from the passenger seat 74b in the width direction DR2. The third blowing outlet 32a positioned on the side of the passenger seat includes a side face outlet 32c and a side defroster outlet 32d. The side face outlet 32c can blow the air toward the passenger seat 74b. The side defroster outlet 32d blows the air toward passenger seat side window 82b (see FIG. 1) as second side window disposed on an opposite side of the passenger seat 74b from the driver seat 74a in the width direction DR2. In FIG. 19, the side face outlets 30c and 32c may not be provided, the second blowing outlet 30a may be the side defroster outlet 30d on the side of the driver seat, and the third blowing outlet 32a may be the side defroster outlet 32d on the side of the passenger seat.

Figure 21:
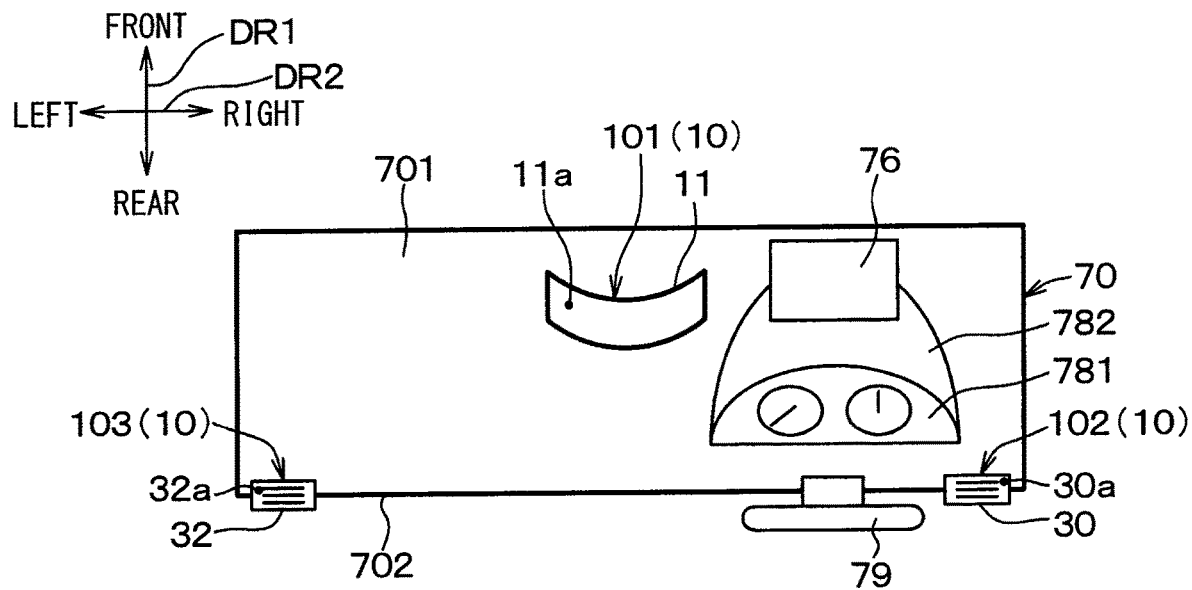
FIG. 21 is a schematic diagram illustrating an instrument panel in a vehicle compartment when viewed from above in a fourth variation of the first embodiment shown in FIG. 1.
Figure 22:
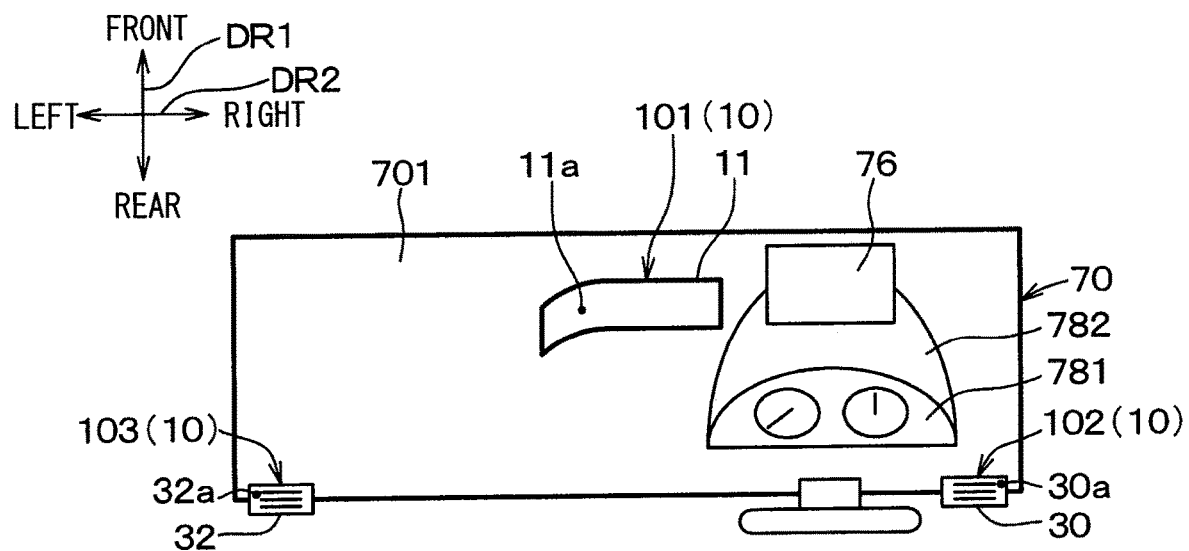
FIG. 22 is a schematic diagram illustrating an instrument panel in a vehicle compartment when viewed from above in a fifth variation of the first embodiment shown in FIG. 1.

(4) Although the first blowing outlet 11a is in a rectangular shape extending in the width direction DR2 as shown in FIG. 1 in each of the above-described first to fifth embodiments, the shape of the first blowing outlet 11a is not limited to the shape. For example, the first blowing outlet 11a may be in a curved or irregular shape as shown in each of FIGS. 20 to 22.

Figure 20:
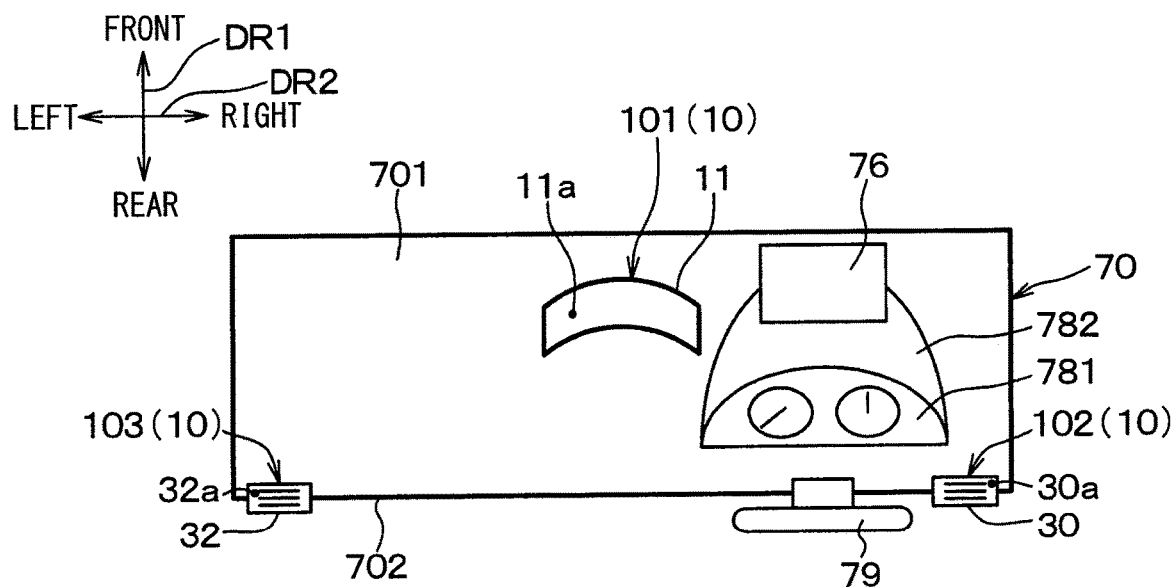
FIG. 20 is a schematic diagram illustrating an instrument panel in a vehicle compartment when viewed from above in a third variation of the first embodiment shown in FIG. 1.

As an example shown in FIG. 20, the first blowing outlet 11a may have a curved shape in which the center of the first blowing outlet 11a bulges toward the vehicle front side when viewed from the vehicle upper side. Alternatively, as an example shown in FIG. 21, the first blowing outlet 11a may have a curved shape in which the center of the first blowing outlet 11a bulges toward the vehicle rear side when viewed from the vehicle upper side. Alternatively, as an example shown in FIG. 22, the first blowing outlet 11a may have an asymmetric shape in which a portion of the first blowing outlet 11a on a side adjacent to the passenger seat 74b is curved when viewed from the vehicle upper side.

(5) In each of the above-described embodiments, the airflow deflection door 13 slides in the front-rear direction DR1 to thereby selectively switch the flow of the air in the duct air passage 12a between the first condition and the second condition. However, the airflow deflection door 13 does not need to switch the flow of the air in the duct air passage 12a into the second condition. In other words, the airflow deflection door 13 may be fixed so as not to be able to slide and the airflow deflection door 13 may be configured to be able to at least bring the flow of the air in the duct air passage 12a into the first condition. The same holds true for the right front blowing unit 104 and the left front blowing unit 105 in each of the third, fourth and sixth embodiments.

(6) In the above-described sixth embodiment, as shown in FIG. 17, the instrument panel 70 is provided with the second blowing outlet 30a, the third blowing outlet 32a, the fourth blowing outlet 34a, and the fifth blowing outlet 40a in addition to the first blowing outlet 11a. However, any or all of the second blowing outlet 30a, the third blowing outlet 32a, the fourth blowing outlet 34a, and the fifth blowing outlet 40a may not be provided.

(7) In the above-described third embodiment, the blowing outlets 11a, 30a, 32a, 34a, and 40a are provided in the instrument panel 70. However, the blowing outlets 11a, 30a, 32a, 34a, and 40a may be provided in a rear area of the vehicle compartment, for example. The same holds true for the first, second, fourth, fifth, and sixth embodiments.

(8) Although the one meter blowing outlet 481 is formed in the meter hood 782 in the above-described fifth embodiment, meter blowing outlets 481 may be formed. In this case, all of the meter blowing outlets 481 are preferably formed symmetrically with respect to the center position CLs of the steering wheel 79 in the width direction DR2.

(9) In the above-described fifth embodiment, the meter blowing outlet 481 is open in the hood lower surface 782b of the meter hood 782. However, the meter blowing outlet 481 may be open in the meter peripheral portion 781b of the dashboard panel 781, for example. In short, the meter blowing outlet 481 may be open anywhere in a meter peripheral area including the meter peripheral portion 781b and the meter hood 782, which is a portion of the dashboard panel 781 excluding the meters 781a.

(10) In FIG. 14 in the above-described fifth embodiment, the hood lower surface 782b of the meter hood 782 in which the meter blowing outlet 481 is open is the smooth curved face. However, the hood lower surface 782b does not need to be smooth. For example, the hood lower surface 782b may be provided with a step.

(11) Although the blowing outlet ribs 485 are provided in the meter blowing outlet 481 in the above-described fifth embodiment as shown in FIG. 14, the blowing outlet ribs 485 may not be provided.

The present disclosure is not limited to the above-described embodiments and can be modified within the scope of the present disclosure as defined by the appended claims. The above-described embodiments are not unrelated to each other and can be combined with each other except for a case where the combination is clearly improper. In the above-described embodiments, it is to be understood that elements constituting the embodiments are not necessary except for a case of being explicitly specified to be necessary and a case of being considered to be absolutely necessary in principle.

Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. Even when a feature such as a material forming a member, a shape of a member, a positional relation of members, it is to be understood that such feature is not limited to a specific material, shape, positional relation, or the like except for a case of being explicitly specified to be necessary and a case of being considered to be absolutely necessary in principle.

The invention claimed is:

1. An air blowing device comprising:
a first blowing portion provided with a first blowing outlet that blows air from a blower unit into a vehicle compartment;
a duct that is connected to the first blowing portion and defines a duct air passage therein, the duct air passage guiding the air from the blower unit to the first blowing outlet;
an airflow deflection door disposed in the duct air passage;
a second blowing portion provided with a second blowing outlet that blows the air from the blower unit into the vehicle compartment; and
a third blowing portion provided with a third blowing outlet that blows the air from the blower unit into the vehicle compartment, wherein
the first blowing portion has a guide surface on a rear side in a front-rear direction of a vehicle, the guide surface serving as a part of the first blowing portion, the guide surface having a cross-sectional shape, viewed in a width direction of the vehicle, that enlarges the first blowing portion toward the rear side and toward a downstream side in a flow direction of the air flowing out of the first blowing portion,
the airflow deflection door
defines at least one of a first passage and a second passage as a part of the duct air passage, the first passage being located on the rear side of the airflow deflection door in the front-rear direction, the second passage being located on a front side of the airflow deflection door in the front-rear direction, and
is configured to be capable of setting a first condition in which a flow of air flowing in the duct air passage is divided into a high-velocity airflow flowing in the first passage and a low-velocity airflow flowing in the second passage by decreasing a sectional area of the first passage to be smaller than a sectional area of the second passage, the high-velocity airflow flowing along the guide surface and being blown into the vehicle compartment, the low-velocity airflow flowing at a flow velocity lower than that of the high-velocity airflow,
the first blowing outlet is located on the front side of a driver seat and a passenger seat, which are arranged in the width direction in the vehicle compartment, in the front-rear direction, and is located in a center area of the vehicle compartment in the width direction,
an entirety of the first blowing outlet is located between a center position of the driver seat and a center position of the passenger seat in the width direction,
the first blowing outlet having an arcuate surface such that a peak of the arcuate surface faces rearward and is located closest to the driver seat and the passenger seat in the front-rear direction of the vehicle,
the first blowing outlet is a single outlet that is configured to blow air during both a defroster mode and a face mode,
the second blowing outlet is located on a side opposite to the passenger seat with respect to the center position of the driver seat in the width direction,
the third blowing outlet is located on a side opposite to the driver seat with respect to the center position of the passenger seat in the width direction,
the first blowing outlet has a first lowermost portion that is located at a lowermost end of the first blowing outlet in an up-down direction of the vehicle,
the second blowing outlet has a second lowermost portion that is a lowermost end of the second blowing outlet in the up-down direction of the vehicle,
the third blowing outlet has a third lowermost portion that is a lowermost end of the third blowing outlet in the up-down direction of the vehicle, and
the first lowermost portion is located above the second lowermost portion and the third lowermost portion in the up-down direction of the vehicle.

2. The air blowing device according to claim 1, wherein the first blowing outlet is divided by an imaginary plane in the width direction, the imaginary plane passing through a center position between the driver seat and the passenger seat in the width direction and dividing the vehicle compartment in the width direction.

3. The air blowing device according to claim 1, wherein the guide surface has a convex shape in cross section when viewed in the width direction.

4. The air blowing device according to claim 1, wherein the airflow deflection door is a sliding door that is slidable in the front-rear direction.

5. The air blowing device according to claim 1, wherein the airflow deflection door switches between the first condition and a second condition in which an airflow is caused differently in the duct air passage as compared to the first condition.

6. The air blowing device according to claim 5, wherein the second condition is at least one of a condition in which the sectional area of the first passage is larger than the sectional area of the second passage and in which a flow velocity of an airflow caused in the first passage is lower than a flow velocity of an airflow caused in the second passage and a condition in which only one of the first passage and the second passage is defined.

7. The air blowing device according to claim 6, further comprising:
a fourth blowing portion provided with a fourth blowing outlet that blows the air from the blower unit into the vehicle compartment;
a fifth blowing portion provided with a fifth blowing outlet that blows the air from the blower unit into the vehicle compartment;
a second duct that is connected to the fourth blowing portion and provided with a second duct air passage, the second duct air passage guiding the air from the blower unit to the fourth blowing outlet;
a third duct that is connected to the fifth blowing portion and provided with a third duct air passage, the third duct air passage guiding the air from the blower unit to the fifth blowing outlet;
a second airflow causing member disposed in the second duct air passage; and a third airflow causing member disposed in the third duct air passage, wherein the guide surface is a first guide surface, the duct is a first duct, and the airflow causing member is a first airflow causing member, the fourth blowing portion has a second guide surface on the rear side in the front-rear direction, the second guide surface configuring a part of the fourth blowing portion, the second guide surface having a cross-sectional shape, viewed in the width direction, that enlarges the fourth blowing portion toward the rear side and toward a downstream side in a flow direction of the air flowing out of the fourth blowing outlet, the fifth blowing portion has a third guide surface on the rear side in the front-rear direction, the third guide surface configuring a part of the fifth blowing portion, the third guide surface having a cross-sectional shape, viewed in the width direction, that enlarges the fifth blowing portion toward the rear side and toward a downstream side in a flow direction of the air flowing out of the fifth blowing outlet, the second airflow causing member
  defines at least one of a third passage and a fourth passage as a part of the second air passage, the third passage being located on the rear side of the second airflow causing member in the front-rear direction, the fourth passage being located on the front side of the second airflow causing member in the front-rear direction, and
  is configured to be capable of setting a condition in which a flow of air flowing in the second duct air passage is divided into a high-velocity airflow flowing in the first passage and a low-velocity airflow flowing in the second passage by decreasing a sectional area of the first passage to be smaller than a sectional area of the second passage, the high-velocity airflow flowing along the second guide surface and being blown into the vehicle compartment, the low-velocity airflow flowing at a flow velocity lower than that of the high-velocity airflow, and the third airflow causing member
  defines at least one of a fifth passage and a sixth passage as a part of the third air passage, the fifth passage being located on the rear side of the third airflow causing member in the front-rear direction, the sixth passage being located on the front side of the third airflow causing member in the front-rear direction, and
  is configured to be capable of setting a condition in which a flow of air flowing in the third duct air passage is divided into a high-velocity airflow flowing in the first passage and a low-velocity airflow flowing in the second passage by decreasing a sectional area of the first passage to be smaller than a sectional area of the second passage, the high-velocity airflow flowing along the third guide surface and being blown into the vehicle compartment, the low-velocity airflow flowing at a flow velocity lower than that of the high-velocity airflow, the fourth blowing outlet is located on a side opposite to the passenger seat with respect to the center position of the driver seat, and the fifth blowing outlet is located on a side opposite to the driver seat with respect to the center position of the passenger seat.

8. The air blowing device according to claim 1, wherein the second blowing outlet provided with at least one of a side face outlet and a side defroster outlet, the side face outlet being capable of blowing the air toward the driver seat, the side defroster outlet blowing the air toward a first side window that is located on a side opposite to the passenger seat with respect to the center position of the driver seat, and the third blowing outlet provided with at least one of a side face outlet and a side defroster blowing outlet, the side face outlet being capable of blowing the air toward the passenger seat, the side defroster outlet blowing the air toward a second side window that is located on a side opposite to the driver seat with respect to the center position of the passenger seat.

9. The air blowing device according to claim 1, wherein the first blowing outlet, the second blowing outlet, and the third blowing outlet are in parallel to each other and connected to the blower unit.

10. The air blowing device according to claim 1, wherein the second blowing outlet and the third blowing outlet are disposed on the front side of the driver seat and the passenger seat in the front-rear direction respectively.

11. The air blowing device according to claim 1, further comprising:

a fourth blowing portion provided with a fourth blowing outlet that blows the air from the blower unit into the vehicle compartment;

a fifth blowing portion provided with a fifth blowing outlet that blows the air from the blower unit into the vehicle compartment;

a second duct that is connected to the fourth blowing portion and defines a second duct air passage therein, the second duct air passage guiding the air from the blower unit to the fourth blowing outlet;

a third duct that is connected to the fifth blowing portion and provided with a third duct air passage, the third duct air passage guiding the air from the blower unit to the fifth blowing outlet;

a second airflow causing member disposed in the second duct air passage; and a third airflow causing member disposed in the third duct air passage, wherein the guide surface is a first guide surface, the duct is a first duct, and the airflow deflection door is a first airflow causing member, the fourth blowing portion has a second guide surface on the rear side in the front-rear direction, the second guide surface configuring a part of the fourth blowing portion, the second guide surface having a cross-sectional shape, viewed in the width direction, that enlarges the fourth blowing portion toward the rear side and toward a downstream side in a flow direction of the air flowing out of the fourth blowing portion, the fifth blowing portion has a third guide surface on the rear side in the front-rear direction, the third guide surface configuring a part of the fifth blowing portion, the third guide surface having a cross-sectional shape, viewed in the width direction, that enlarges the fifth blowing portion toward the rear side and toward a downstream side in a flow direction of the air flowing out of the fifth blowing portion, the second airflow causing member
  defines at least one of a third passage and a fourth passage as a part of the second air passage, the third passage being located on the rear side of the second airflow causing member in the front-rear direction, the fourth passage being located on the front side of the second airflow causing member in the front-rear direction, and is configured to be capable of setting a condition in which a flow of air flowing in the second duct air passage is divided into a high-velocity airflow flowing in the third passage and a low-velocity airflow flowing in the fourth passage by decreasing a sectional area of the third passage to be smaller than a sectional area of the fourth passage, the high-velocity airflow flowing along the second guide surface and being blown into the vehicle compartment, the low-velocity airflow flowing at a flow velocity lower than that of the high-velocity airflow, and the third airflow causing member defines at least one of a fifth passage and a sixth passage as a part of the third air passage, the fifth passage being located on the rear side of the third airflow causing member in the front-rear direction, the sixth passage being located on the front side of the third airflow causing member in the front-rear direction, and is configured to be capable of setting a condition in which a flow of air flowing in the third duct air passage is divided into a high-velocity airflow flowing in the fifth passage and a low-velocity airflow flowing in the sixth passage by decreasing a sectional area of the fifth passage to be smaller than a sectional area of the sixth passage, the high-velocity airflow flowing along the third guide surface and being blown into the vehicle compartment, the low-velocity airflow flowing at a flow velocity lower than that of the high-velocity airflow, the fourth blowing outlet is located on the side opposite to the passenger seat with respect to the center position of the driver seat in the width direction and on the front side of the second blowing portion in the front-rear direction, and the fifth blowing outlet is located on the side opposite to the driver seat with respect to the center position of the passenger seat in the width direction and on the front side of the third blowing outlet in the front-rear direction.

12. The air blowing device according to claim 11, wherein the first blowing portion, the fourth blowing portion, and the fifth blowing portion configure a part of an instrument panel provided in the vehicle compartment, the first blowing outlet, the fourth blowing outlet, and the fifth blowing outlet are provided in an upper surface of the instrument panel, and the rear side in the front-rear direction is a vehicle rear side, and the front side in the front-rear direction is a vehicle front side.

13. The air blowing device according to claim 12, wherein the first blowing outlet, the fourth blowing outlet, and the fifth blowing outlet are arranged on the vehicle rear side of a window lower end portion included in a windshield, the window lower end portion has a curved shape in which a central portion of the window lower end portion bulges toward the vehicle front side when viewed in an up-down direction of the vehicle, and the first blowing outlet, the fourth blowing outlet, and the fifth blowing outlet have a shape curved along the window lower end portion when viewed in the up-down direction.

14. The air blowing device according to claim 12, wherein the first blowing outlet is arranged on the vehicle rear side of a window lower end portion included in a windshield, the window lower end portion has a curved shape in which a central portion of the window lower end portion bulges toward the vehicle front side when viewed in an up-down direction of the vehicle, and the first blowing outlet has a shape curved along the window lower end portion when viewed in the up-down direction.

15. The air blowing device according to claim 12, wherein the first blowing outlet has a curved shape in which a central portion of the first blowing outlet bulges toward the vehicle front side when viewed in an up-down direction of the vehicle.

16. The air blowing device according to claim 12, further comprising:

a meter blowing portion provided with a meter blowing outlet; and a blowing direction adjusting door that is disposed in the meter blowing portion and has an air guide surface guiding the air to flow out of the meter blowing outlet along the air guide surface, the blowing direction adjusting door adjusting a blowing direction of the air flowing out of the meter blowing outlet by changing an angle of the air guide surface, wherein the instrument panel has a meter panel that is arranged on the vehicle front side of the driver seat in the vehicle compartment in the front-rear direction and has a meter and a meter peripheral portion other than the meter and a meter hood that is located above the meter panel in an up-down direction of the vehicle, extends in the width direction, and protrudes from the meter panel toward the vehicle rear direction, and the meter blowing outlet is open in a meter peripheral area, which has the meter peripheral portion and the meter hood, and blows the air from the blower unit toward the vehicle rear side through a steering wheel that is arranged between the meter panel and the driver seat in the front-rear direction.

17. The air blowing device according to claim 1, wherein, the first blowing portion configures a part of an instrument panel provided in the vehicle compartment, the first blowing outlet is provided in an upper surface of the instrument panel, and the rear side in the front-rear direction is a vehicle rear side, and the front side in the front-rear direction is a vehicle front side.

18. An air blowing device comprising:

a first blowing portion provided with a first blowing outlet that blows air from a blower unit into a vehicle compartment, the vehicle compartment having an instrument panel;

a duct that is connected to the first blowing portion and defines a duct air passage therein, the duct air passage guiding the air from the blower unit to the first blowing outlet;

an airflow deflection door disposed in the duct air passage;

a meter blowing portion provided with a meter blowing outlet;

a second blowing portion provided with a second blowing outlet that blows the air from the blower unit into the vehicle compartment; and a third blowing portion provided with a third blowing outlet that blows the air from the blower unit into the vehicle compartment, wherein the first blowing portion has a guide surface on a rear side in a front-rear direction of a vehicle, the guide surface serving as a part of the first blowing portion, the guide surface having a cross-sectional shape, viewed in a width direction of the vehicle, that enlarges the first blowing portion toward the rear side and toward a downstream side in a flow direction of the air flowing out of the first blowing portion, the airflow deflection door defines at least one of a first passage and a second passage as a part of the duct air passage, the first passage being located on the rear side of the airflow deflection door in the front-rear direction, the second passage being located on a front side of the airflow deflection door in the front-rear direction, and is configured to be capable of setting a first condition in which a flow of air flowing in the duct air passage is divided into a high-velocity airflow flowing in the first passage and a low-velocity airflow flowing in the second passage by decreasing a sectional area of the first passage to be smaller than a sectional area of the second passage, the high-velocity airflow flowing along the guide surface and being blown into the vehicle compartment, the low-velocity airflow flowing at a flow velocity lower than that of the high-velocity airflow, the first blowing outlet is located on the front side of a driver seat and a passenger seat, which are arranged in the width direction in the vehicle compartment, in the front-rear direction, and is located in a center area of the vehicle compartment in the width direction, an entirety of the first blowing outlet is located between a center position of the driver seat and a center position of the passenger seat in the width direction, the first blowing outlet having an arcuate surface such that a peak of the arcuate surface faces rearward and is located closest to the driver seat and the passenger seat in the front-rear direction of the vehicle, the first blowing outlet is a single outlet that is configured to blow air during both a defroster mode and a face mode, the instrument panel has a meter panel that is arranged on the vehicle front side of the driver seat in the vehicle compartment in the front-rear direction and has a meter and a meter peripheral portion other than the meter and a meter hood that is located above the meter panel in an up-down direction of the vehicle, extends in the width direction, and protrudes from the meter panel toward the vehicle rear direction, the meter blowing outlet is open in a meter peripheral area, which has the meter peripheral portion and the meter hood, and blows the air from the blower unit toward the vehicle rear side through a steering wheel that is arranged between the meter panel and the driver seat in the front-rear direction, the second blowing outlet is located on a side opposite to the passenger seat with respect to the center position of the driver seat in the width direction, the third blowing outlet is located on a side opposite to the driver seat with respect to the center position of the passenger seat in the width direction, the first blowing outlet has a first lowermost portion that is located at a lowermost end of the first blowing outlet in an up-down direction of the vehicle, the second blowing outlet has a second lowermost portion that is a lowermost end of the second blowing outlet in the up-down direction of the vehicle, the third blowing outlet has a third lowermost portion that is a lowermost end of the third blowing outlet in the up-down direction of the vehicle, and the first lowermost portion is located above the second lowermost portion and the third lowermost portion in the up-down direction of the vehicle.

19. An air blowing device comprising:

a first blowing portion provided with a first blowing outlet that blows air from a blower unit into a vehicle compartment;

a duct that is connected to the first blowing portion and defines a duct air passage therein, the duct air passage guiding the air from the blower unit to the first blowing outlet;

an airflow deflection door disposed in the duct air passage;

a second blowing portion provided with a second blowing outlet that blows the air from the blower unit into the vehicle compartment; and a third blowing portion provided with a third blowing outlet that blows the air from the blower unit into the vehicle compartment, wherein the first blowing portion has a guide surface on a rear side in a front-rear direction of a vehicle, the guide surface serving as a part of the first blowing portion, the guide surface having a cross-sectional shape, viewed in a width direction of the vehicle, that enlarges the first blowing portion toward the rear side and toward a downstream side in a flow direction of the air flowing out of the first blowing portion, the airflow deflection door defines at least one of a first passage and a second passage as a part of the duct air passage, the first passage being located on the rear side of the airflow deflection door in the front-rear direction, the second passage being located on a front side of the airflow deflection door in the front-rear direction, and is configured to be capable of setting a first condition in which a flow of air flowing in the duct air passage is divided into a high-velocity airflow flowing in the first passage and a low-velocity airflow flowing in the second passage by decreasing a sectional area of the first passage to be smaller than a sectional area of the second passage, the high-velocity airflow flowing along the guide surface and being blown into the vehicle compartment, the low-velocity airflow flowing at a flow velocity lower than that of the high-velocity airflow, the first blowing outlet is located on the front side of a driver seat and a passenger seat, which are arranged in the width direction in the vehicle compartment, in the front-rear direction, and is located in a center area of the vehicle compartment in the width direction, an entirety of the first blowing outlet is located between a center position of the driver seat and a center position of the passenger seat in the width direction, the first blowing outlet having a first end that is curved rearward toward the driver seat and the passenger seat and a second end that is straight, parallel to the driver seat and the passenger seat, the first blowing outlet is a single outlet that is configured to blow air during both a defroster mode and a face mode, the second blowing outlet is located on a side opposite to the passenger seat with respect to the center position of the driver seat in the width direction, the third blowing outlet is located on a side opposite to the driver seat with respect to the center position of the passenger seat in the width direction, the first blowing outlet has a first lowermost portion that is located at a lowermost end of the first blowing outlet in an up-down direction of the vehicle, the second blowing outlet has a second lowermost portion that is a lowermost end of the second blowing outlet in the up-down direction of the vehicle, the third blowing outlet has a third lowermost portion that is a lowermost end of the third blowing outlet in the up-down direction of the vehicle, and the first lowermost portion is located above the second lowermost portion and the third lowermost portion in the up-down direction of the vehicle.

\* \* \* \* \*